United States Patent
Koryakin et al.

(10) Patent No.: US 12,217,080 B1
(45) Date of Patent: *Feb. 4, 2025

(54) PHYSICAL MEMORY MANAGEMENT FOR VIRTUAL MACHINES

(71) Applicant: PARALLELS INTERNATIONAL GMBH, Schaffhausen (CH)

(72) Inventors: Alexey Koryakin, Moscow (RU); Nikolay Dobrovolskiy, Moscow (RU)

(73) Assignee: Parallels International GmbH, Schaffhausen (CH)

( * ) Notice: Subject to any disclaimer, the term of this patent is extended or adjusted under 35 U.S.C. 154(b) by 0 days.

This patent is subject to a terminal disclaimer.

(21) Appl. No.: 18/590,447

(22) Filed: Feb. 28, 2024

Related U.S. Application Data

(63) Continuation of application No. 18/190,409, filed on Mar. 27, 2023, now Pat. No. 11,934,862, which is a continuation of application No. 17/342,927, filed on Jun. 9, 2021, now Pat. No. 11,625,262, which is a continuation of application No. 16/553,411, filed on Aug. 28, 2019, now Pat. No. 11,113,094.

(51) Int. Cl.
*G06F 9/455* (2018.01)
*G06F 9/38* (2018.01)
*G06F 9/48* (2006.01)

(52) U.S. Cl.
CPC ........ *G06F 9/45558* (2013.01); *G06F 9/3836* (2013.01); *G06F 9/4843* (2013.01); *G06F 2009/45575* (2013.01); *G06F 2009/45583* (2013.01)

(58) Field of Classification Search
None
See application file for complete search history.

(56) References Cited

U.S. PATENT DOCUMENTS

| | | |
|---|---|---|
| 6,785,886 B1 | 8/2004 | Lim et al. |
| 6,961,941 B1 | 11/2005 | Nelson et al. |
| 7,073,042 B2 | 7/2006 | Uhlig et al. |
| 7,124,327 B2 | 10/2006 | Bennett et al. |
| 7,356,735 B2 | 4/2008 | Bennett et al. |
| 7,516,453 B1 | 4/2009 | Bugnion |
| 7,555,592 B1 | 6/2009 | Koryakin et al. |
| 7,596,677 B1 | 9/2009 | Koryakin et al. |
| 7,757,034 B1 * | 7/2010 | Dobrovolskiy ..... G06F 9/45533 711/6 |

(Continued)

OTHER PUBLICATIONS

Liu et al. "Efficient VM Memory Balancing Algorithm Design and Implementation", 2019 IEEE, pp. 208-213.*

(Continued)

*Primary Examiner* — Van H Nguyen
(74) *Attorney, Agent, or Firm* — Rosenberg, Klein & Lee

(57) ABSTRACT

Virtual computer systems (virtual machines) have become increasingly common with the evolution of virtualization technology, cloud computing, etc. However, as a virtual machine and its associated guest operating system seek to execute and/or access a page of memory through synchronous processes execution of the virtual processor associated with the virtual processing is blocked until the page of memory is locked and available. Accordingly, time is wasted on calls waiting for physical page availability thereby reducing utilization of the host machine and virtual machine respectively. To address this an asynchronous virtual machine environment is established allowing the virtual machine or physical machine to handle additional operations whilst waiting for physical page availability.

6 Claims, 10 Drawing Sheets

(56) References Cited

U.S. PATENT DOCUMENTS

| | | | |
|---|---|---|---|
| 8,037,280 | B2 | 10/2011 | Pandey et al. |
| 8,166,276 | B2 | 4/2012 | Serebrin |
| 8,176,488 | B1 | 5/2012 | Dobrovolskiy et al. |
| 8,286,162 | B2 | 10/2012 | Neiger et al. |
| 8,539,137 | B1 | 9/2013 | Protassov et al. |
| 9,465,634 | B2 | 10/2016 | Yoshida et al. |
| 10,496,547 | B1 * | 12/2019 | Naenko ............... G06F 12/0873 |
| 11,113,094 | B1 * | 9/2021 | Koryakin ............... G06F 9/4843 |
| 11,625,262 | B1 * | 4/2023 | Koryakin ............... G06F 9/4843 718/1 |
| 11,934,862 | B1 * | 3/2024 | Koryakin ............... G06F 9/4843 |
| 2010/0274947 | A1 * | 10/2010 | Ohta ................... G06F 9/45558 718/1 |

OTHER PUBLICATIONS

Ye et al. "Energy-Efficient Memory Management in Virtual Machine Environments", 2011 IEEE, 8 pages.*

Koukis et al. "Memory and Network Bandwidth Aware Scheduling of Multiprogrammed Workloads on Clusters of SMPs", 2006 IEEE, 10 pages.*

Luo et al. "Optimizing the Memory Management of a Virtual Machine Monitor on a NUMA System", 2016 IEEE, pp. 66-74.

Nyrkov et al. "Analysis of Platform Vulnerabilities for the Virtualization Process", 2018 IEEE, pp. 94-97.

Hannan "A Survey of Optimizing the Memory Management of a Virtual Machine Monitor on a NUMA System" Downloaded from https://www.slideshare.net/Fajar_112/optimizing-the-memory-management-of-a-virtual-machine-monitor-on-a-numa-system-a-survey (Mar. 24, 2023).

Zhao et al. "Dynamic Memory Balancing for Virtual Machines." ACM SIGOPS Operating Systems Review 43.3 (2009): 37-47.

Ren, Yi, et al. "Shared-Memory Optimizations for Inter Virtual Machine Communication." ACM Computing Surveys (CSUR) 48.4 (2016): 1-42.

Ding, Ye, et al. "Review of Virtual Memory Optimization in Cloud Environment." 2016 International Conference on Intelligent Networking and Collaborative Systems (INCoS). IEEE, 2016.

* cited by examiner

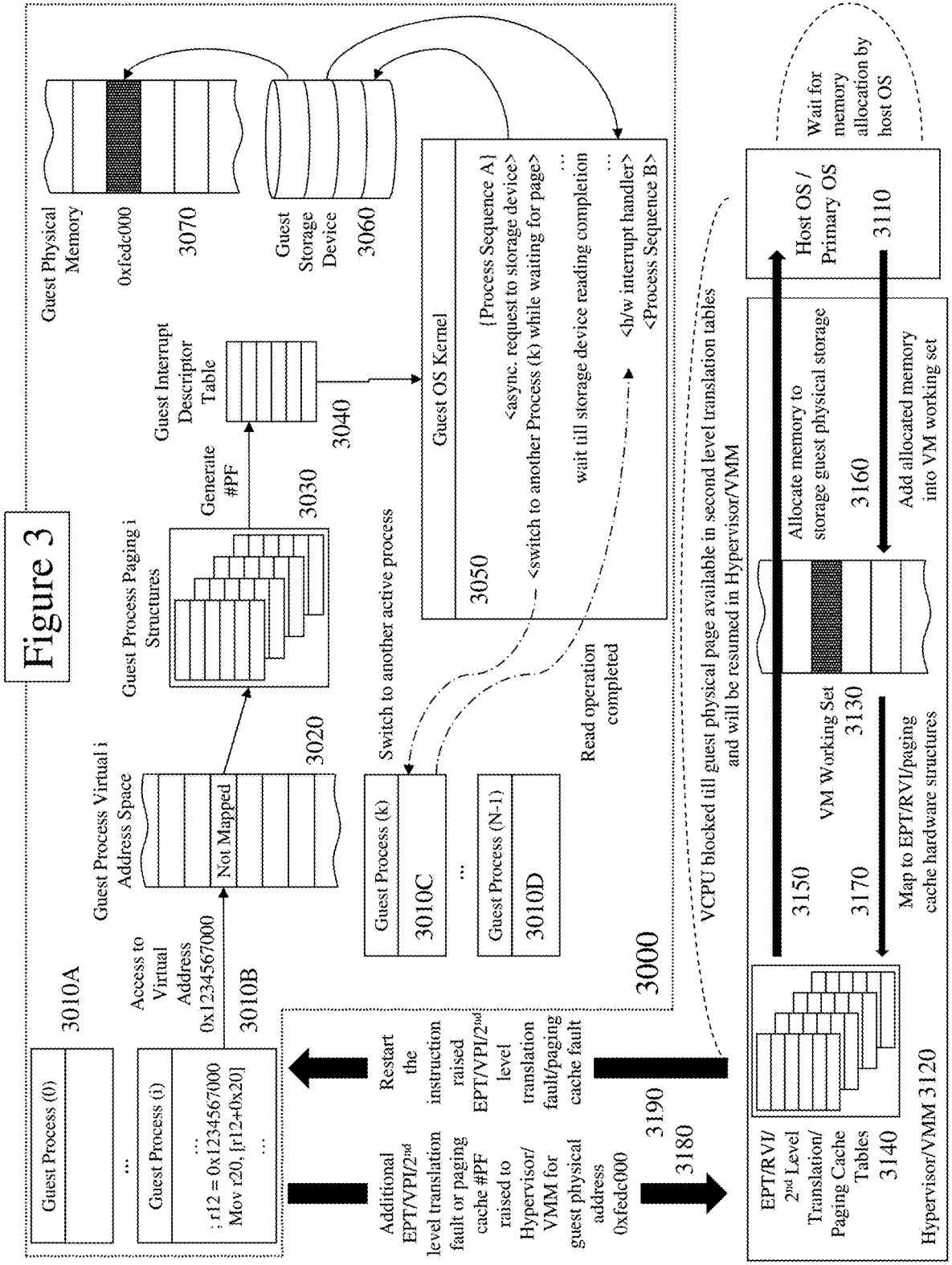

PHYSICAL MEMORY MANAGEMENT FOR VIRTUAL MACHINES

CROSS-REFERENCE TO RELATED APPLICATIONS

This patent application claims the benefit of priority as a continuation of U.S. patent application Ser. No. 18/190,409 filed Mar. 27, 2023 which has issued as U.S. Pat. No. 11,934,862; which itself claims the benefit of priority from U.S. patent application Ser. No. 17/342,927 filed Jun. 9, 2021 which has issued as U.S. Pat. No. 11,625,262; which itself claims the benefit of priority from U.S. patent application Ser. No. 16/553,411 filed Aug. 28, 2019 which has issued as U.S. Pat. No. 11,113,094; the entire contents of each being incorporated herein by reference.

FIELD OF THE INVENTION

This patent application relates to virtualization environments and virtual machines (virtualized computer systems) and more specifically to physical memory management for virtualization environments and virtual machines.

BACKGROUND OF THE INVENTION

Virtual computer systems (virtual machines) have become increasingly common with the evolution of virtualization technology, cloud computing, etc. Typically, one or more virtual machines are created to perform certain tasks that are different than the tasks performed in a host environment. Such virtual machines may be a short-term instantiation such as being created solely to execute a task or tasks whilst in other instances the virtual machines may be medium term or long term instantiations.

Typically, memory is the most constrained resource in virtual machines and virtualized environments. Whilst virtualization allows for memory to be over committed, which improves utilization, it can lead to issues when not managed properly. At present physical memory management for virtual machines is built upon a process of "lazy" locking/writing physical pages/blocks into or from memory on demand. Within the prior art the focus to date has been on avoiding conflicts arising from multiple virtual machines accessing a single physical memories associated with the host computer system.

However, as a virtual machine and its associated guest operating system seek to execute and/or access a page then a synchronous application programming interface (API) establishes a call to the physical computing system hosting the virtual machine and its associated host operating system access the page in physical memory and blocks the virtual CPU's execution until the page is locked and available. At this point the physical memory page is mapped to a paging cache (see U.S. Pat. No. 7,596,677) or hardware-assisted nested paging mechanisms such as Intel™ Extended Page Tables (EPT), AMD™ Rapid Virtualization Indexing (RVI), and ARM™ Second Level Address Translation (SLAT)) wherein execution of the interrupted instruction associated with the page access request restarts.

Accordingly, time is wasted on synchronous API calls waiting for physical page availability reducing utilization of the host machine and virtual machine. It would therefore be beneficial to provide a mechanism for a virtual machine or physical machine to handle additional operations in an asynchronous environment where a process associated with a virtual machine is waiting for physical page availability.

Other aspects and features of the present invention will become apparent to those ordinarily skilled in the art upon review of the following description of specific embodiments of the invention in conjunction with the accompanying figures.

SUMMARY OF THE INVENTION

It is an object of the present invention to mitigate limitations within the prior art with respect to virtualization environments and virtual machines (virtualized computer systems) and more specifically to physical memory management for virtualization environments and virtual machines.

However, embodiments generally support optimizing execution of synchronous workloads which are performed in virtualized environments and block virtual central processing unit (CPU) execution synchronously for periods of time. Accordingly, embodiments of the invention whilst described and depicted with respect to virtual machines may be with any virtualization techniques where execution routine(s) representing virtualizable processor resource(s) can be interrupted (e.g. seamlessly for a virtualized environment) for a significant time and processor time schedulers are in execution within the virtualized environment.

In accordance with an embodiment of the invention there is provided a system comprising:
 a memory storing computer executable instructions for execution by a microprocessor; and
 the microprocessor in communication with the non-transitory memory and memory; wherein
 the computer executable instructions when executed by the microprocessor configure the microprocessor to:
  establish a virtual processor as part of a virtualization system executing a first guest process;
  inject a guest hardware interrupt into the virtual processor executing the first guest process whilst a current instruction of the virtual processor is blocked waiting for data requested by a previous instruction or the current instruction to become available to the virtual processor.

In accordance with an embodiment of the invention there is provided a system comprising:
 a non-transitory memory storing data;
 one or more memories storing computer executable instructions for execution by one or more microprocessors;
 the one or more microprocessors in communication with the non-transitory memory and the one or more memories; wherein
 the computer executable instructions when executed by the one or more microprocessors configure the one or more microprocessors to:
  execute a virtual machine comprising at least a virtual processor;
  execute a first guest operating system (OS) process of a plurality of guest OS processes with the virtual machine; and
  inject a guest hardware interrupt into the virtual microprocessor executing the first guest OS process of the plurality of guest OS processes to switch the virtual processor to execute another guest OS process of the plurality of guest OS processes whilst the first guest OS process of the plurality of guest OS processes waits for data requested by a previous instruction or the current instruction to become available to the first guest OS process of the plurality of guest OS processes; and provide a hypervisor or virtual machine monitor; and the hypervisor or virtual machine monitor controls the virtual machine.

In accordance with an embodiment of the invention there is provided a method comprising:

a non-transitory memory storing data;

one or more memories storing computer executable instructions for execution by one or more microprocessors;

the one or more microprocessors in communication with the non-transitory memory and the one or more memories; wherein the computer executable instructions when executed by the one or more microprocessors configure the one or more microprocessors to:

execute a virtual machine comprising at least a virtual processor;

execute a plurality of guest operating system (guest OS) processes upon one or more virtual machines comprising one or more virtual processors; and inject a guest hardware interrupt into a virtual microprocessor of the plurality of virtual processors executing a first guest OS process of the plurality of guest OS processes to transfer the virtual processor of the plurality of virtual processors to another guest OS process of the plurality of guest OS processes and execute the another guest OS process of the plurality of guest OS processes; and provide a virtual machine monitor (VMM) which controls the virtual machine.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein:

FIG. 3 depicts a schematic representation of an embodiment of the invention wherein a Hypervisor/Virtual Machine Monitor (VMM) manages guest physical memory for a virtual machine executing a guest operating system and guest operating system processes;

DETAILED DESCRIPTION

Figures 1A, 1B:
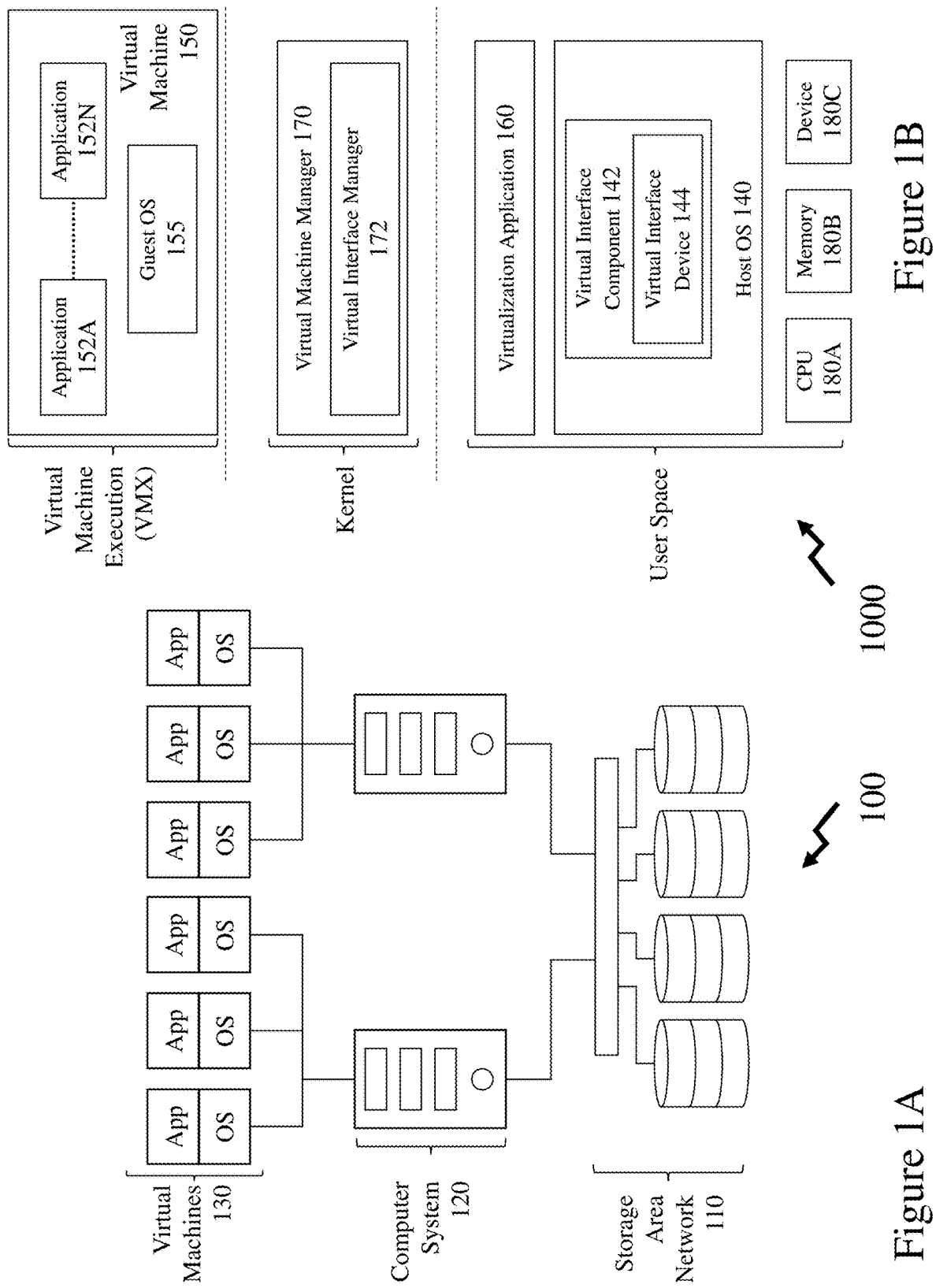
FIG. 1A depicts schematically an architecture supporting embodiments of the invention.
FIG. 1B depicts a high-level diagram of a computer system supporting exemplary virtual machine execution environments supporting one or more aspects and/or embodiments of the invention.

The present description is directed to virtual machines (virtualized computer systems) and more specifically to physical memory management for virtual machines.

The ensuing description provides representative embodiment(s) only, and is not intended to limit the scope, applicability or configuration of the disclosure. Rather, the ensuing description of the embodiment(s) will provide those skilled in the art with an enabling description for implementing an embodiment or embodiments of the invention. It being understood that various changes can be made in the function and arrangement of elements without departing from the spirit and scope as set forth in the appended claims. Accordingly, an embodiment is an example or implementation of the inventions and not the sole implementation. Various appearances of "one embodiment," "an embodiment" or "some embodiments" do not necessarily all refer to the same embodiments. Although various features of the invention may be described in the context of a single embodiment, the features may also be provided separately or in any suitable combination. Conversely, although the invention may be described herein in the context of separate embodiments for clarity, the invention can also be implemented in a single embodiment or any combination of embodiments.

Reference in the specification to "one embodiment", "an embodiment", "some embodiments" or "other embodiments" means that a particular feature, structure, or characteristic described in connection with the embodiments is included in at least one embodiment, but not necessarily all embodiments, of the inventions. The phraseology and terminology employed herein is not to be construed as limiting but is for descriptive purpose only. It is to be understood that where the claims or specification refer to "a" or "an" element, such reference is not to be construed as there being only one of that element. It is to be understood that where the specification states that a component feature, structure, or characteristic "may", "might", "can" or "could" be included, that particular component, feature, structure, or characteristic is not required to be included.

Reference to terms such as "left", "right", "top", "bottom", "front" and "back" are intended for use in respect to the orientation of the particular feature, structure, or element within the figures depicting embodiments of the invention. It would be evident that such directional terminology with respect to the actual use of a device has no specific meaning as the device can be employed in a multiplicity of orientations by the user or users.

Reference to terms "including", "comprising", "consisting" and grammatical variants thereof do not preclude the addition of one or more components, features, steps, integers or groups thereof and that the terms are not to be construed as specifying components, features, steps or integers. Likewise, the phrase "consisting essentially of", and grammatical variants thereof, when used herein is not to be construed as excluding additional components, steps, features integers or groups thereof but rather that the additional features, integers, steps, components or groups thereof do not materially alter the basic and novel characteristics of the claimed composition, device or method. If the specification or claims refer to "an additional" element, that does not preclude there being more than one of the additional element.

A "virtual computer system" or "virtual machine" (VM) as used herein and throughout this specification refers to, but is not limited to, an emulation of a computer system. A virtual machine is based on computer architectures and provides the functionality of a physical computer. Their implementations may involve specialized hardware, software, or a combination thereof. A virtual machine may refer to a system virtual machine (also termed full virtualization VMs) provide a substitute for a real computer system (machine) and provide the functionality needed to execute an entire operating system. A hypervisor uses native execution to share and manage hardware, allowing for multiple environments which are isolated from one another to be executed, yet exist on the same physical computer system (machine). Hypervisors may employ hardware-assisted virtualization and/or virtualization-specific hardware primarily from the host central processing units (CPUs). In contrast, process virtual machines execute computer programs in a platform-independent environment.

A "virtual machine monitor" or "hypervisor" as used herein and throughout this specification refers to, but is not limited to, computer software, firmware or hardware that creates and runs one or more virtual machines. A computer system upon which a hypervisor runs one or more virtual machines is typically referred to as a host machine whilst each virtual machine is typically referred to as a guest machine. A hypervisor presents the guest operating systems with a virtual operating platform and manages the execution of the guest operating systems. For example, multiple instances of a variety of operating systems may share the same virtualized hardware resources, for example, Linux, Windows, and macOS operating system instances can all run on a single physical machine. This contrasts with operating-system-level virtualization, where all instances (usually called containers) must share a single kernel, though the guest operating systems can differ in user space, such as different Linux distributions with the same kernel. Accordingly, a hypervisor may abstract the physical layer and present this abstraction to one or more virtual machines to use by providing interfaces between the underlying hardware and virtual devices of the virtual machines. For example, processor virtualization may be implemented by the hypervisor scheduling time slots on one or more physical processors for a virtual machine rather than a virtual machine actually having a dedicated physical processor.

A "page" as used herein and throughout this specification refers to, but is not limited to, a memory page or virtual memory page (virtual page) which is a fixed-length contiguous block of virtual memory as described, for example, by a single entry in a page table. A page represents the smallest unit of data for memory management in a virtual memory operating system. Embodiments of the invention are applicable not only to a standard page size of 4 Kilobytes but also to other page sizes such as 16 Kilobytes, 64 Kilobytes, 2 Megabytes, 4 Megabytes, and 1 Gigabytes for example.

A "page table" as used herein and throughout this specification refers to, but is not limited to, a data structure used by a virtual memory system in a computer operating system to store the mapping between virtual addresses and physical addresses. Virtual addresses are used by the program executed by the accessing process, while physical addresses are used by the hardware, or more specifically, by the RAM subsystem.

A "portable electronic device" (PED) as used herein and throughout this disclosure, refers to a wireless device used for communications and other applications that requires a battery or other independent form of energy for power. This includes devices, but is not limited to, such as a cellular telephone, smartphone, personal digital assistant (PDA), portable computer, pager, portable multimedia player, portable gaming console, laptop computer, tablet computer, and an electronic reader.

A "fixed electronic device" (FED) as used herein and throughout this disclosure, refers to a wireless and/or wired device used for communications and other applications that requires connection to a fixed interface to obtain power. This includes, but is not limited to, a laptop computer, a personal computer, a computer server, a kiosk, a gaming console, a digital set-top box, an analog set-top box, an Internet enabled appliance, an Internet enabled television, and a multimedia player.

A "software application", also referred to as an "application" or "app", as used herein may refer to, but is not limited to, a "standalone software application", an element of a "software suite", a computer program designed to allow an individual to perform an activity, a computer program designed to allow an electronic device to perform an activity, and a computer program designed to communicate with local and/or remote electronic devices. An application thus differs from an operating system (which runs a computer), a utility (which performs maintenance or general-purpose chores), and a programming tools (with which computer programs are created). Generally, within the following description with respect to embodiments of the invention an application is generally presented in respect of software permanently and/or temporarily installed upon a PED and/or FED.

A "wearable device" (WED) or "wearable sensor" (WES) relates to miniature electronic devices that are worn by the user including those under, within, with or on top of clothing and are part of a broader general class of wearable technology which includes "wearable computers" which in contrast are directed to general or special purpose information technologies and media development. Such wearable devices and/or wearable sensors may include, but not be limited to, smartphones, smart watches, e-textiles, smart shirts, activity trackers, smart glasses, environmental sensors, medical sensors, biological sensors, physiological sensors, chemical sensors, ambient environment sensors, position sensors, neurological sensors, drug delivery systems, medical testing and diagnosis devices, and motion sensors.

Referring to FIG. 1A there is depicted a schematic architecture 100 supporting embodiments of the invention. As depicted a plurality of virtual machines (VMs) 130 are associated with a plurality of computer systems 120 which are themselves associated with a storage area network (SAN) 110. The plurality of computer systems 120 may be directly connected or indirectly connected via one or more communications networks to the SAN 110. Accordingly, each VM 130 may employ virtual memory pages which are mapped to physical memory pages upon the SAN 110. Within embodiments of the invention a computer system 120 may be connected to one or more SANs 110. Whilst the descriptions in respect of FIGS. 1A to 1B are described with respect to a computer system 120 hosting one or more VMs 130 it would be evident that embodiments of the invention may be supported by a PED, a FED, a WED, a server or a WES directly or indirectly through communications within one of the plurality of computer systems 120. A computer system 120 may itself be a PED, a FED, a WED, a server, or a WES. Accordingly, a computer system 120 may, as depicted in FIG. 1B, support a virtual machine execution (VMX) environment as a host system directly or indirectly or it may include a virtual machine monitor (VMM) facilitating execution of one or more VMs, each of which may run a guest operating system (OS) 155 to manage one or more guest applications 152A to 152N respectively.

FIG. 1B depicts a high-level diagram of a computer system (host system) 1000 supporting exemplary VMX environments supporting one or more aspects and/or embodiments of the present disclosure. The host system 1000, e.g. computer system 120 in FIG. 1A, may include one or more central processing units (CPU) 180A communicatively coupled to one or more memory devices 180B and one or more peripheral devices 180C via a system bus, not depicted for clarity. The host system 1000 may implement a virtual execution environment for executing the software developed for a platform that is different from the native platform of the host system 1000. In certain implementations, the virtual execution environment may be implemented using certain hardware-assisted virtualization features of the CPU 180A, which may support executing, at an elevated privilege level one or more elements, including but not limited to, a VMM 170 that manages one or more VMs. In various implementations, the VMM 170 may be implemented as a kernel module, a kernel extension, a driver, or a part of the host OS 145. The host OS 140 may further include a virtual interface component 142 which virtualizes a virtual interface component 142 to manage one or more virtual interface devices 144 for use by the VM 150 and/or host OS 140.

The VMM 170 may present a VM 150 with an abstraction of one or more virtual processors, while retaining selective control of processor resources, physical memory, interrupt management, and input/output (I/O). The VMM 170 may also present a VM 150 with an abstraction of one or more virtual interface devices 144 of the virtual interface component 142. A VM 150 may implement a software environment which may be represented by a stack including a guest operating system (OS) 155 and one or more applications 155A-155N. Each VM 150 may operate independently of other VMs and use the VMM-facilitated interface to the processors, memory, storage, graphics, and I/O provided by the host system 1000. The VMM 170 may include a virtual interface manager 172 to receive instructions to create a communication channel between a host OS 140 and a guest OS 155. The virtual interface manager 172 may also send a request to host OS 140 to create a virtual interface device 144 and provide the virtual interface device 144 to guest OS 155. In considering VMX operation then there are two kinds of VMX operation commonly referred to, namely VMX root operation and VMX non-root operation. In general, a VMM, such as VMM 170 in FIG. 1B, will run in VMX root operation and guest software, such as guest OS 155 and applications 152A to 152N will run in VMX non-root operation. Transitions between VMX root operation and VMX non-root operation are called VMX transitions. There are two kinds of VMX transitions, those into VMX non-root operation from VMX operation are called VM entries whilst those from VMX non-root operation to VMX root operation are called VM exits.

Figure 1C:
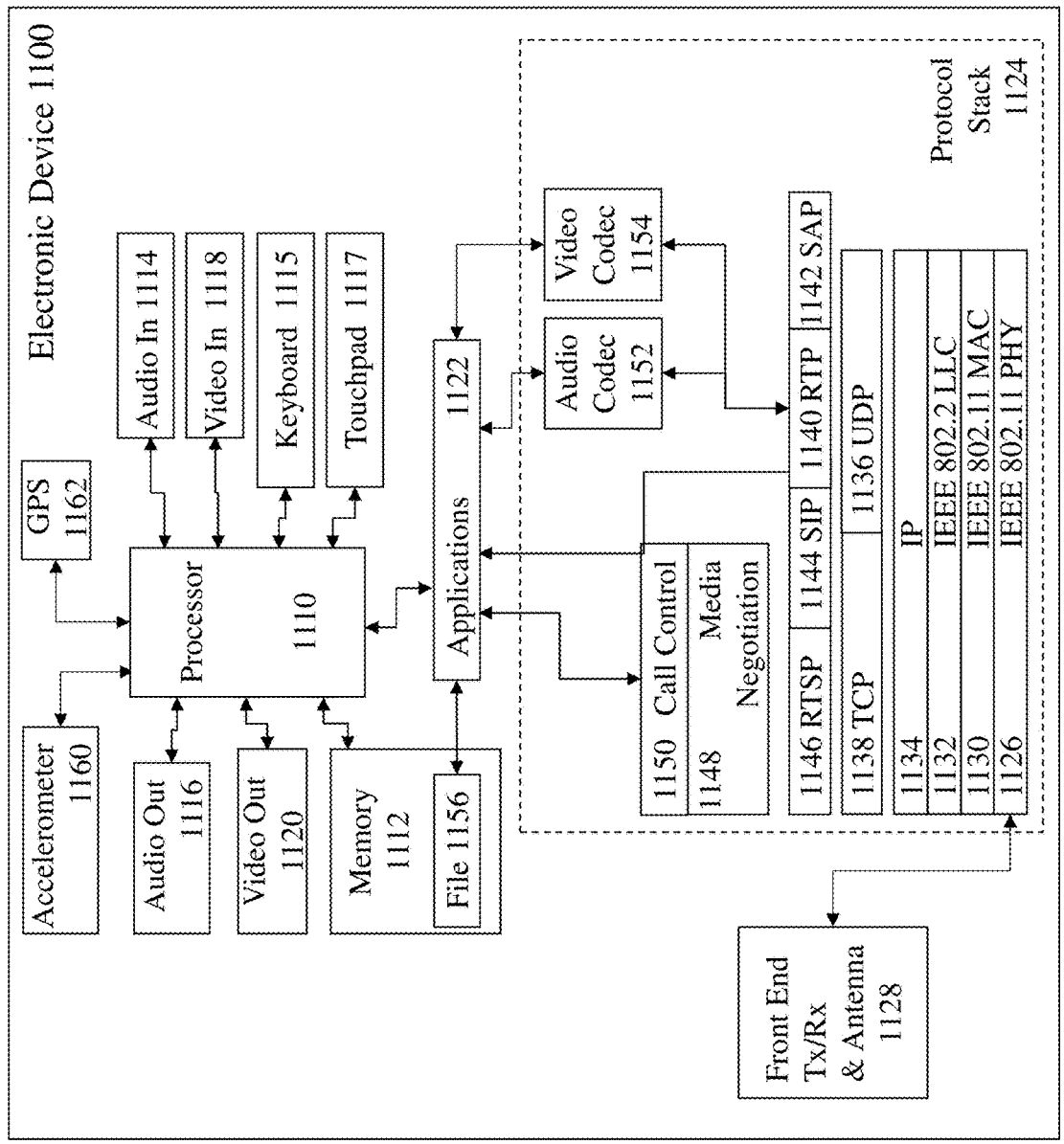
FIG. 1C depicts a simplified schematic of an electronic device supporting virtual machine systems and virtual machine applications/platforms (VMS-VMAPs) according to embodiments of the invention.

Now referring to FIG. 1C there is depicted an electronic device 1100 supporting VM systems and VM applications/platforms (VMS-VMAPs) according to embodiments of the invention. Electronic device 1100 may, for example, be a PED, a FED, a WED, or a WES and may include additional elements above and beyond those described and depicted or it may comprise only a subset of the elements described and depicted. Accordingly, the electronic device 1100 may directly support one or more virtual machines (VMs) or it may access one or more VMs through one or more communication interfaces of the electronic device 1100. As such the electronic device 1100 may be a computer system such as computer system 120 in FIG. 1A or a host system such as host system 1000 in FIG. 1B.

The electronic device 1100 includes one or more processors 1110 and a memory 1112 coupled to processor(s) 1110. AP 1106 also includes one or more processors 1111 and a memory 1113 coupled to processor(s) 1110. A non-exhaustive list of examples for processor 1110 includes a central processing unit (CPU), a digital signal processor (DSP), a reduced instruction set computer (RISC), a complex instruction set computer (CISC) and the like. Furthermore, processor 1110 may be part of application specific integrated circuits (ASICs) or may be a part of application specific standard products (ASSPs). A non-exhaustive list of examples for memory 1112 includes any combination of the following semiconductor devices such as registers, latches, ROM, EEPROM, flash memory devices, non-volatile random-access memory devices (NVRAM), SDRAM, DRAM, double data rate (DDR) memory devices, SRAM, universal serial bus (USB) removable memory, and the like.

Electronic device 1100 may include an audio input element 1114, for example a microphone, and an audio output element 1116, for example, a speaker, coupled to any of processors 1110. Electronic device 1100 may include a video input element 1118, for example, a video camera or camera, and a video output element 1120, for example an LCD display, coupled to any of processors 1110. Electronic device 1100 also includes a keyboard 1115 and touchpad 1117 which may for example be a physical keyboard and touchpad allowing the user to enter content or select functions within one of more applications 1122. Alternatively, the keyboard 1115 and touchpad 1117 may be predetermined regions of a touch sensitive element forming part of the display within the electronic device 1100. The one or more applications 1122 that are typically stored in memory 1112 and are executable by any combination of processors 1110. Electronic device 1100 also includes accelerometer 1160 providing three-dimensional motion input to the process 1110 and GPS 1162 which provides geographical location information to processor 1110.

Electronic device 1100 includes a protocol stack 1124 and AP 1106 includes a communication stack 1125. Within system 1100 protocol stack 1124 is shown as IEEE 802.11 protocol stack but alternatively may exploit other protocol stacks such as an Internet Engineering Task Force (IETF) multimedia protocol stack for example. Likewise, AP stack 1125 exploits a protocol stack but is not expanded for clarity. Elements of protocol stack 1124 and AP stack 1125 may be implemented in any combination of software, firmware and/or hardware. Protocol stack 1124 includes an IEEE 802.11-compatible PHY module 1126 that is coupled to one or more Front-End Tx/Rx & Antenna 1128, an IEEE 802.11-compatible MAC module 1130 coupled to an IEEE 802.2-compatible LLC module 1132. Protocol stack 1124 includes a network layer IP module 1134, a transport layer User Datagram Protocol (UDP) module 1136 and a transport layer Transmission Control Protocol (TCP) module 1138.

Protocol stack 1124 also includes a session layer Real Time Transport Protocol (RTP) module 1140, a Session Announcement Protocol (SAP) module 1142, a Session Initiation Protocol (SIP) module 1144 and a Real Time Streaming Protocol (RTSP) module 1146. Protocol stack 1124 includes a presentation layer media negotiation module 1148, a call control module 1150, one or more audio codecs 1152 and one or more video codecs 1154. Applications 1122 may be able to create maintain and/or terminate communication sessions with any of devices 1107 by way of AP 1106. Typically, applications 1122 may activate any of the SAP, SIP, RTSP, media negotiation and call control modules for that purpose. Typically, information may propagate from the SAP, SIP, RTSP, media negotiation and call control modules to PHY module 1126 through TCP module 1138, IP module 1134, LLC module 1132 and MAC module 1130.

Portable and fixed electronic devices represented by electronic device 1100 may include one or more additional wireless or wired interfaces in addition to the depicted IEEE 802.11 interface which may be selected from the group comprising IEEE 802.15, IEEE 802.16, IEEE 802.20, UMTS, GSM 850, GSM 900, GSM 1800, GSM 1900, GPRS, ITU-R 5.138, ITU-R 5.150, ITU-R 5.280, IMT-1000, DSL, Dial-Up, DOCSIS, Ethernet, G.hn, ISDN, MoCA, PON, and Power line communication (PLC).

As noted above physical memory management for VMs within the prior art exploits a process based upon lazy locking/writing physical pages/blocks on demand. Accordingly, initially upon instantiating a VM there is a null or empty working set and there are no pages mapped in either the paging cache or extended page table (EPT). Within the specification all references to a paging cache may also refer, without express recitation, to other similar software techniques to virtualize a guest linear address space by mapping to guest physical memory pages such as Parallels Paging Cache and Virtual Translation Lookaside Buffer (TLB) for example as well as those from other software virtualization vendors. Further, all references within the specification to Extended Page Tables (EPT) and EPT faults may also include, without express recitation, other hardware-assisted nested paging organization technologies including, for example, Intel™ Extended Page Tables (EPT), AMD™ Rapid Virtualization Indexing (RVI) and ARM™ Second Level Address Translation (SLAT). A new page is added to a working set when a guest OS seeks to execute and/or access the corresponding page the first time. The virtual CPU (VCPU) exits from native guest code execution (VMX non-root mode) to VMM by page fault (#PF) exception (in case paging cache) or EPT fault (in nested paging case). Accordingly, a #PF/EPT fault handler executes a synchronous API call to the host OS in order to obtain the physical page and blocks the VCPU execution until the page is locked and available. The physical page is then mapped to the paging cache or EPT page tables wherein execution of the interrupted instruction continues (re-starts).

Accordingly, the inventors have established an alternate methodology such that processing resources are not lost (wasted) on the resulting synchronous API call wait times for the physical page availability. Rather, the inventors have established a VM processing sequence wherein an asynchronous operation is started to get an unavailable page. This may, for example, be in a similar manner to the VM system initiating asynchronous device requests. Accordingly, embodiments of the invention established by the inventors monitor other asynchronous request completion in the VMM, track system timers etc. whilst the pending asynchronous operation is not completed. Accordingly, other pending guest interrupt requests are injected by the VMM to the VCPU before the page faulted instruction as if it was not executed. In this manner, on the blocked path of VCPU execution, namely waiting for physical page capturing, in the prior art the inventors methodology provides for the VMM injecting guest OS interrupts, provided that these are allowed by other system such as, for example, EFLAGS.IF interrupt enable flag within the EFLAGS status register on Intel™ x86 microprocessors, Intel™ task priority register (TPR), and Local Advanced Programmable Interrupt Controller (APIC) masks), etc. and initiates a guest interrupt handler native execution. The guest handler will process the interrupt and return back to the fault instruction thereby capturing the physical page in parallel with the guest handler execution.

Subsequently, if there is another page access fault during the guest handler execution then the VMM adds the new page to the existing asynchronous request capturing the first page and monitors for asynchronous events and interrupts again. Recursive asynchronous page writing requests are possible. Recursive guest interrupts with injection are also feasible if the interrupts are allowed by the virtualized hardware, e.g. EFLAGS.IF, etc. Within other embodiments of the invention the asynchronous schema described within this specification according to embodiments of the invention may allow not only for lock page requests to be moved but other long synchronous application programming interface (API) calls can be also be processed asynchronously.

Currently, operating systems have memory management subsystems utilizing available physical memory pages between all processes and threads running concurrently on the same hardware platform. In order to manage memory software calls a correspondent OS API makes specific system calls to the OS kernel. Within current operating systems this is undertaken within the scope of process contexts running in parallel and accessing hardware resources (including memory) in parallel with other. Each process has an independent virtual (or linear) address space where, for example, at least a portion of a deprivileged user space is fully separated from the virtual address spaces of other processes. This is possible as current microprocessors support what are referred to as paging mechanisms, which are organized by using hardware based CPU page tables. Accordingly, an operating system builds a personal hierarchy of page tables for each process it is executing. Therefore, each process has independent virtual (linear) space. In contrast, instruction memory operands reference memory using effective addresses, which are made equivalent to the linear space addresses in current operating systems through the use of a model, such as the flat segment model or flat memory model. Typically, the flat segment model is preferred as it allows for enhanced flexibility in memory allocation and can also prevent buffer overruns.

Accordingly, an OS memory management subsystem will create one or more virtual address mappings within one or more process page tables which point to physical memory pages allocated for the process or processes. Such mappings within paging structures are also used by operating systems to rebalance physical memory between concurrent processes, organize swapping and copy-on-write mechanisms etc. Often an operating system will create such mappings by using "lazy" schema on demand by first access to page virtual address.

Figure 2A:
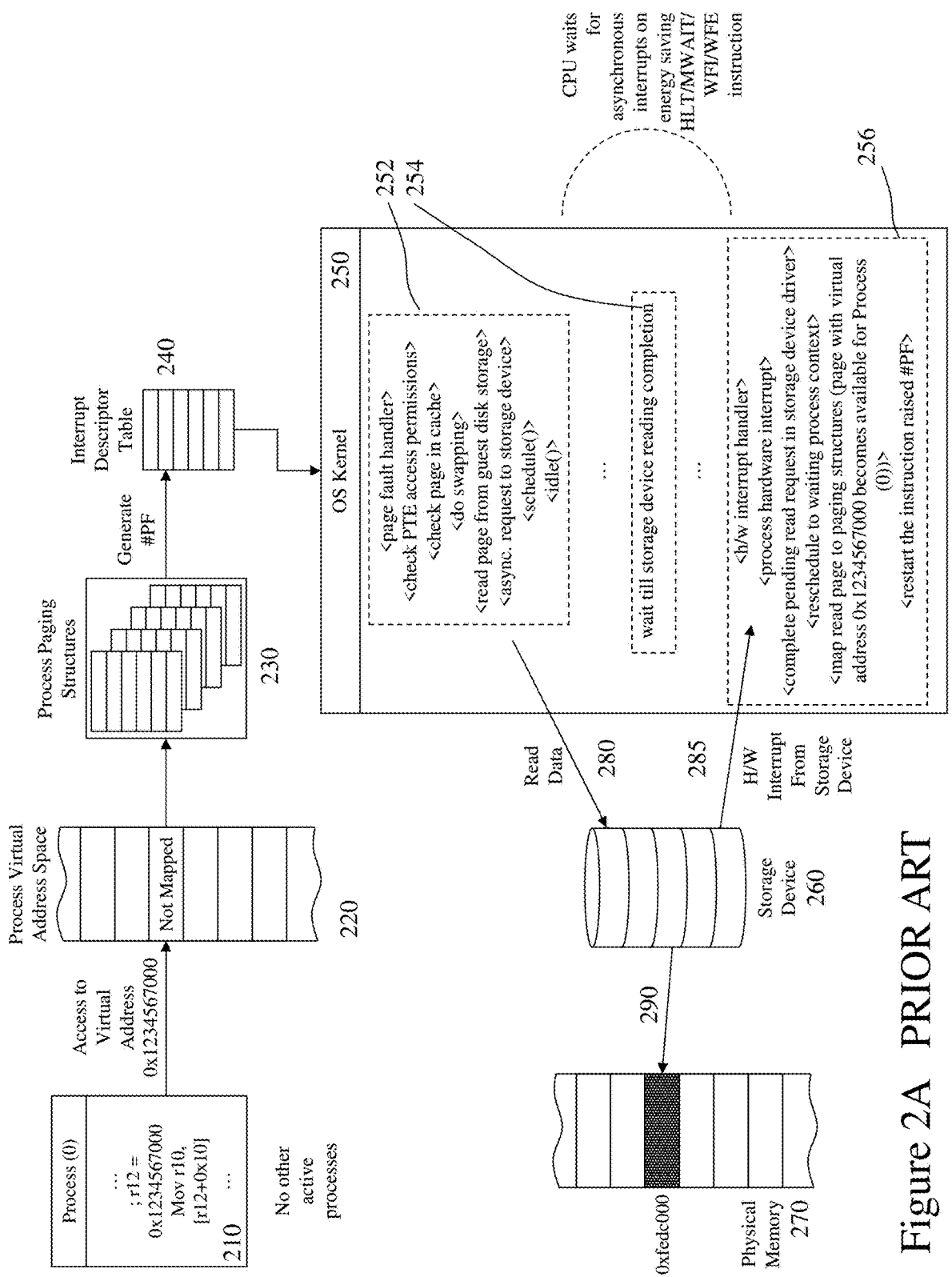
FIG. 2A depicts schematically a process for an operating system obtaining a page from a swap file within a virtual machine process according to the prior art.

Now referring to FIG. 2A there is depicted schematically a process for an operating system obtaining a page from a swap file according to the prior art. A swap file being a file on a computer memory, typically a hard disk, which is used to provide space for programs which have been transferred from a processor's memory. Accordingly, as depicted for the context of this exemplary process for a memory instruction, represented by Process (0) 210, tries read 8 bytes to register r10 from the memory within effective address 0x1234567010 (i.e. a virtual address or linear address on a system with a typical OS and typical microprocessor(s)). In the instances where the requested page was swapped out before being accessed or it is the first time that this particular page is being accessed or was not loaded for example from a memory mapped file at this point, then there is no valid mapping within the paging structures, represented by process virtual address space 220 and process paging structures 230, and microprocessor (processor) raises an exception page fault. Exception and interrupt handler references are described within what is referred to as an interrupt descriptor table 240. Each processor exception and interrupt has its own vector within the interrupt descriptor table 240. The processor identifies each handler code entry point and switches from the interrupted context, within the context of FIG. 2A the process the user space code is executing is a "mov" instruction, and continues execution from the first instruction of the software handler, which is usually located in the OS kernel 250.

Accordingly, as depicted in OS kernel 250 the processor executes first command sequence 252 wherein:
the page fault handler checks reason of the exception;
access permissions are checked and verified;
the page is looked for within the page cache currently stored in memory; and
failure to locate the page in memory results in the page fault handler calling the block (disk) device driver managing the memory device (e.g. hardware peripheral device) where the content of the required page is located (i.e. where the page was swapped out before); and
the disk device kernel driver submits an asynchronous input/output (I/O) request to the memory device (hardware peripheral device).

Further, as a hardware peripheral device is generally much slower at processing and executing instructions than the processor then the hardware peripheral device requires time to process the I/O request. Accordingly, the processor calls a rescheduling routine within first command sequence 252 to give processor time to those processes/threads requiring it whilst the current process is blocked by waiting I/O operation completion.

Within the scenario depicted in FIG. 2A there are no other active processes/threads, which are ready to execute. Accordingly, the OS kernel 250 whilst executing the rescheduling process within the first command sequence 252 moves the processor to an idle state by including a HLT, MWAIT, WFE, WFI or similar instruction thereby placing the processor into an energy saving mode until an asynchronous event (interrupt) occurrence occurs subsequently. Accordingly, the processor waits until the storage device reading completes, depicted as second command sequence 254.

The asynchronous I/O request is depicted as command 280 to the storage device 260. The storage device 260 identifies the page of data as having address 0xfedc000 within the physical memory 270 of the storage device and issues a hardware (H/W) interrupt 285 to the OS kernel 250. Accordingly, the I/O operation completes, the hardware interrupt is generated, the disk driver completes the I/O request, and the page content (address 0x1234567000) is ready for usage. In this example the page content with address 0x1234567000 was read to physical page 0xfedc000 within the physical memory 270.

Accordingly, upon receipt of the hardware interrupt the OS kernel 250 resumes with third command sequence 256 wherein:
resumed page fault handler maps physical page 0xfedc000 to virtual address 0x1234567000 in the process paging structures which is then available to Process (0) 210; and
resumes execution of interrupted user space "mov r10, [r12+0x10]".

As depicted the instruction continues execution without failure (i.e. without page fault).

Figure 2B:
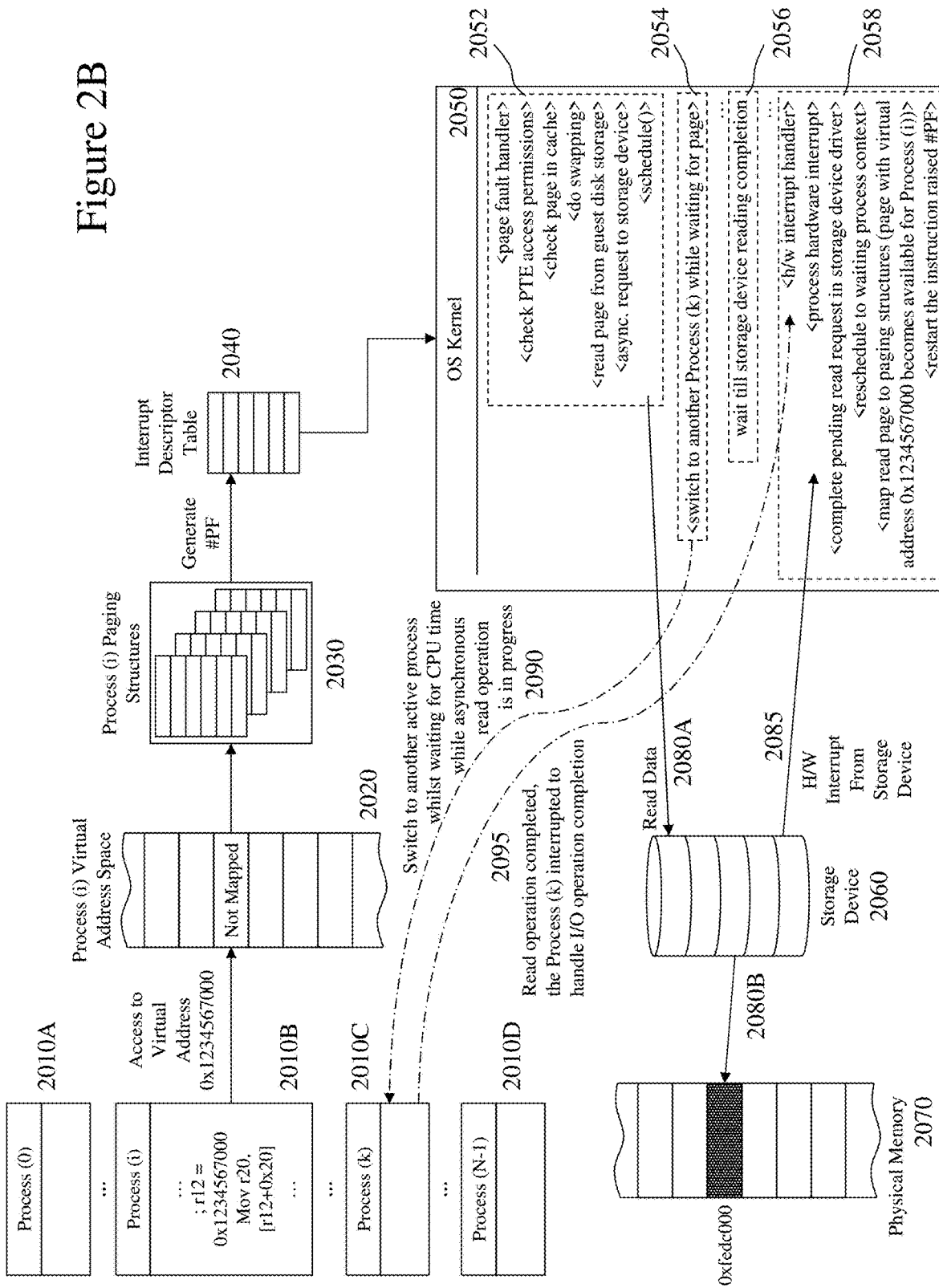
FIG. 2B depicts schematically a process for an operating system obtaining a page from a swap file within a virtual machine process according to the prior art when there are guest processes, which are ready for execution and waits for a processor time quantum from guest OS scheduler.

Now referring to FIG. 2B there is depicted schematically a process for an operating system obtaining a page from a swap file according to an embodiment of the invention. Accordingly, in this schematic rather than a single process as in FIG. 2A there are multiple processes depicted as Process (0) 2010A, Process (i) 2010B, Process (k) 2010C and Process (N−1) 2010D. As with FIG. 2A the context of this exemplary process for a memory instruction, represented by Process (i) 2010B, tries read 8 bytes to register r10 from the memory within effective address 0x1234567010 (i.e. a virtual address or linear address on a system with a typical OS and typical microprocessor(s)). In the instances where the requested page was swapped out before being accessed or it is the first time that this particular page is being accessed or was not loaded for example from a memory mapped file at this point, then there is no valid mapping within the paging structures, represented by process virtual address space 2020 and process paging structures 2030, and microprocessor (processor) raises an exception page fault. Exception and interrupt handler references are described within what is referred to as an interrupt descriptor table 240. Each processor exception and interrupt has its own vector within the interrupt descriptor table 2040. The processor identifies each handler code entry point and switches from the interrupted context, within the context of FIG. 2A the process the user space code is executing is a "mov" instruction, and continues execution from the first instruction of the software handler, which is usually located in the OS kernel 2050.

Accordingly, as depicted in OS kernel 2050 the processor executes first command sequence 2052 wherein:
the page fault handler checks reason of the exception;
access permissions are checked and verified;
the page is looked for within the page cache currently stored in memory; and
failure to locate the page in memory results in the page fault handler calling the block (disk) device driver managing the memory device (e.g. hardware peripheral device) where the content of the required page is located (i.e. where the page was swapped out before); and
the disk device kernel driver submits an asynchronous input/output (I/O) request to the memory device (hardware peripheral device).

Further, as a hardware peripheral device is generally much slower at processing and executing instructions than the processor then the hardware peripheral device requires time to process the I/O request. Accordingly, the processor calls a rescheduling routine within first command sequence 2052 to give processor time to those processes/threads requiring it whilst the current process is blocked by waiting I/O operation completion.

Within the scenario depicted in FIG. 2B as there are other active processes/threads, e.g. Process (0) 2010A, Process (k) 2010C, and Process (N−1) 2010D, of which one or more are ready to execute. Accordingly, the OS kernel 2050 whilst executing the rescheduling process within the first command sequence 2052 moves the processor to another process, Process (k) 2010C, in second command sequence 2054. As depicted, this comprises first flow 2090 which switches to the other active process, Process (k) 2010C, whilst waiting for CPU time whilst the asynchronous read operation is in process. Subsequently, upon completion of the asynchronous read operation Process (k) 2010C is interrupted allowing the CPU to handle I/O operation completion. This pausing of the process within the OS kernel 2050 being held until the storage device reading is completed being depicted by third command sequence 2056.

The asynchronous I/O request is depicted as command 2080A to the storage device 2060 resulting in mapping to the physical memory 2080B. The storage device 2060 identifies the page of data as having address 0xfedc000 within the physical memory 2070 of the storage device and issues a hardware (H/W) interrupt 2085 to the OS kernel 2050. Accordingly, the I/O operation completes, the hardware interrupt is generated, the disk driver completes the I/O request, and the page content (address 0x1234567000) is ready for usage. In this example the page content with address 0x1234567000 was read to physical page 0xfedc000 within the physical memory 2070.

Accordingly, upon receipt of the hardware interrupt the OS kernel 2050 resumes with fourth command sequence 2058 wherein:
  hardware interrupt handler completes processing upon receipt of hardware interrupt;
  pending read request is completed within the storage device driver;
  process reschedules to a waiting process context;
  resumed page fault handler maps physical page 0xfedc000 to virtual address 0x1234567000 in the process paging structures which is then available to Process (i) 2010B;
  resumes execution of interrupted user space "mov r10, [r12+0x10]"; and
  the instruction continues execution without failure (i.e. without page fault).

Accordingly, the process depicted schematically in FIG. 2B redirects the processor to executing another process, Process (k) 2010C, upon the asynchronous request to the hardware peripheral device arising from the processor's execution of Process (0) 2010B. It would be evident that according to the time required to complete the asynchronous request that the processor may execute portions of multiple processes, e.g. Process (k) 2010C, Process (N−1) 2010D and Process (0) 2010A.

It would be further evident that subsequent operations within another process, e.g. Process (N−1) 2010D being executed whilst an asynchronous request is being process from an initial process, e.g. Process (i) 2010B, may itself call another asynchronous request. Within an embodiment of the invention the second asynchronous request may cause Process (N−1) 2010D to pause pending its completion and the process to return to Process (i) 2010B even if no hardware interrupt has been received. Alternatively, second asynchronous request from Process (N−1) 2010D may trigger the processor to process another process, e.g. Process (0) 2010A, wherein if the hardware interrupt from the second asynchronous request from Process (N−1) 2010D completes before the first asynchronous request from Process (i) 2010B then the processor proceeds within Process (N−1) 2010D until the first asynchronous request is completed and the processor resumes with Process (i) 2010B. If, however, the first asynchronous request from Process (i) 2010B completes before the second asynchronous request then the processor resumes Process (i) 2010B.

Whilst the first asynchronous request is completed the status of Process (i) is marked as blocked by Input/Output (I/O) operation or as being in "wait" state. Accordingly, the asynchronous request will not be completed and the interrupted thread of Process (i) cannot be rescheduled by the OS scheduler because it is not in a "ready for execution" state. The process depicted schematically within FIG. 2B relates to a prior art methodology.

Whilst FIGS. 2A and 2B are described and depicted with respect to an asynchronous request to a hardware peripheral device it would be evident that the concepts described and depicted may be applied to any process where an idle of the originating process occurs. Optionally, within other embodiments of the invention the processor may determine and store timing information for different processes, e.g. hardware calls, memory paging, etc. and trigger an asynchronous shift to another process whenever a current process step has timing which exceeds a predetermined period of time which may be defined for the system, the processor, or the process.

Accordingly, a memory call to an external hard drive may trigger the processor shifting to another process whereas a memory call to a flash memory may not trigger the processor shifting to another process as the timing is below the threshold. Within a multi-threaded process architecture, the process may run several parallel threads executing instructions in the same virtual memory address space associated with the process. Whilst within the descriptions in respect of FIGS. 2A to 3 respectively and FIGS. 5A to 6B respectively the inventors refer to processes as rescheduling units considered by the OS scheduler to choose the next execution target it would be evident that the invention also covers the methodology of threads rescheduling as well. In essence, embodiments of the invention are not defined by what unit the OS scheduler uses for scheduling.

Alternatively, within other embodiments of the invention the transfer by the processor from one process to another may be controlled through a setting associated with the processor, system or process. Accordingly, a process may enable shifting to another process whilst another process may block such shifting. Optionally, this setting may be dynamically associated according to processor loading, type of process, etc. Within other embodiments of the invention the process to which the processor moves may be defined or determined by one or more factors including, but not limited to, priorities associated with the processes, a percentage completion of the processes, and start time of the process.

Now referring to FIG. 3 there is depicted a schematic representation of an embodiment of the invention wherein a Hypervisor/Virtual Machine Monitor (VMM) manages guest physical memory for a Virtual Machine executing a guest operating system (OS) and guest OS processes. Whilst, embodiments of the invention may be described with respect to a specific Hypervisor and/or VMM, e.g. the (type II) hypervisor within Parallels™ Desktop which coexists with the primary OS on the host computer, a (type I) bare-metal hypervisor which is thin software level between the primary OS and guest OS, or a Parallels Desktop Lite type of virtualization solution emulating a guest platform in user-space virtual machine monitor and using system virtualization libraries to launch guest code natively. The embodiments of the invention may be implemented within any guest OS virtualization engine including, but not limited to, hardware-assisted virtualizations such as Intel™ VT-x, AMD™ AMD-V, ARM™ Hypervisor mode, binary translation, software debugger technique, emulation, and paravirtualization where lazy guest page allocation is employed to map guest physical pages to a guest environment extension. These extensions may, for example, be Intel™ EPT extensions, AMD™ RVI extensions, ARM™ second level translation mechanisms, paging cache(s) or virtual Translation Lookaside Buffer (TLB) techniques although other similar mechanisms can also be used.

Accordingly, as depicted the schematic comprises process schematic 3000 which is equivalent to that depicted in FIG. 2B comprising Guest Process (0) 3010A, Guest Process (i) 3010B, Guest Process (k) 3010C, and Guest Process (N−1) 3010D together with guest virtual address space 3020 for virtual Process (i) 3010B, guest process paging structure 3030 for Process (i) 3030, guest interrupt descriptor table 3040, Guest OS kernel 3050, guest storage device 3060, and guest physical memory 3070. Accordingly, the process flow executed by the processor within process schematic 3000 is functionally equivalent to that depicted in FIG. 2B wherein upon making a page request to a peripheral hardware device the processor suspends Guess Process (i) 3010B and executes Guest Process (k) 3010C until the hardware interrupt is received from the guest storage device 3060 and the processor resumes Guest Process (i) 3010B.

Also depicted in FIG. 3 are the processes associated with the Hypervisor/VMM 3120 and its interactions with the Host OS/Primary OS 3110. Accordingly, a virtual machine employs a VM working set, see for example VM Working Set 3130 within Hypervisor/VMM 3120, which manages allocations of guest physical pages for that particular VM. This is populated on demand when guest code associated with a guest process accesses a guest page or guest pages. Irrespective of whether an accessed page 0x1234567000 mapping exists within the guest paging structures then an association between a guest physical page and real/host physical page will be created on the particular page the process accesses. Accordingly, within the example depicted after the guest OS kernel 3050 finishes mapping the virtual address 0x1234567000 to the guest physical address 0xfedc000 then allocation of the physical memory for the guest page 0xfedc000 is still required and accordingly the guest page access additionally raises an EPT fault 3080 to the Hypervisor/VMM 3120.

Accordingly, the additional EPT fault is raised as command 3180 which is the additional EPT/VPI/2nd level translation fault or paging cache #PF raised to Hypervisor/VMM 3120 for the guest physical address 0xfedc000. The Hypervisor/VMM 3120 comprises EPT/RVI/2nd Level Translation/Paging Cache Tables 3140 and VM Working Set 3130. Accordingly, the Hypervisor/VMM 3120 initiates a Request 3150 for the page from the Host OS/Primary OS 3110. As accessing physical memory from the Host OS/Primary OS 3110 may also take some time then the virtual CPU running the Hypervisor/VMM 3310 stays blocked until the host physical page allocation is complete. If the physical page process takes a long time, then the virtual CPU (VCPU) will not execute any other guest process instructions until finalization of the interrupted "mov" process. However, within a virtual multi-processor guest system other VCPUs may continue to execute the guest process code. Optionally, the Host OS/Primary OS 3110 may be a service partition of the system. Accordingly, as depicted the Host OS/Primary OS 3110 in response to the Request 3150 to allocate memory to the storage guest physical system returns a Response 3160 which adds the allocated memory into the VM Working Set 3130. Accordingly, the Hypervisor/VMM 3120 then generates a Mapping 3170 which maps the allocated memory within the VM Working Set 3130 to the EPT/RVI/2nd Level Translation/Paging Cache Tables 3140. At this point the Hypervisor/VMM 3120 generates a Restart Command 3190 which restarts the instruction which raised the EPT/VPI/2nd level translation fault within Process (i) 3010B.

Whilst within FIG. 3 the process has been described with respect to the additional EPT fault which is raised as command 3180 being generated subsequent to the portion of the process generating the #PF into the Guest Interrupt Descriptor Table 3040 within process schematic 3000 it would be evident that within other embodiments of the invention that this portion of the process may be executed prior to, plesiochronously with, or concurrently with that associated with process schematic 3000.

Figure 4:
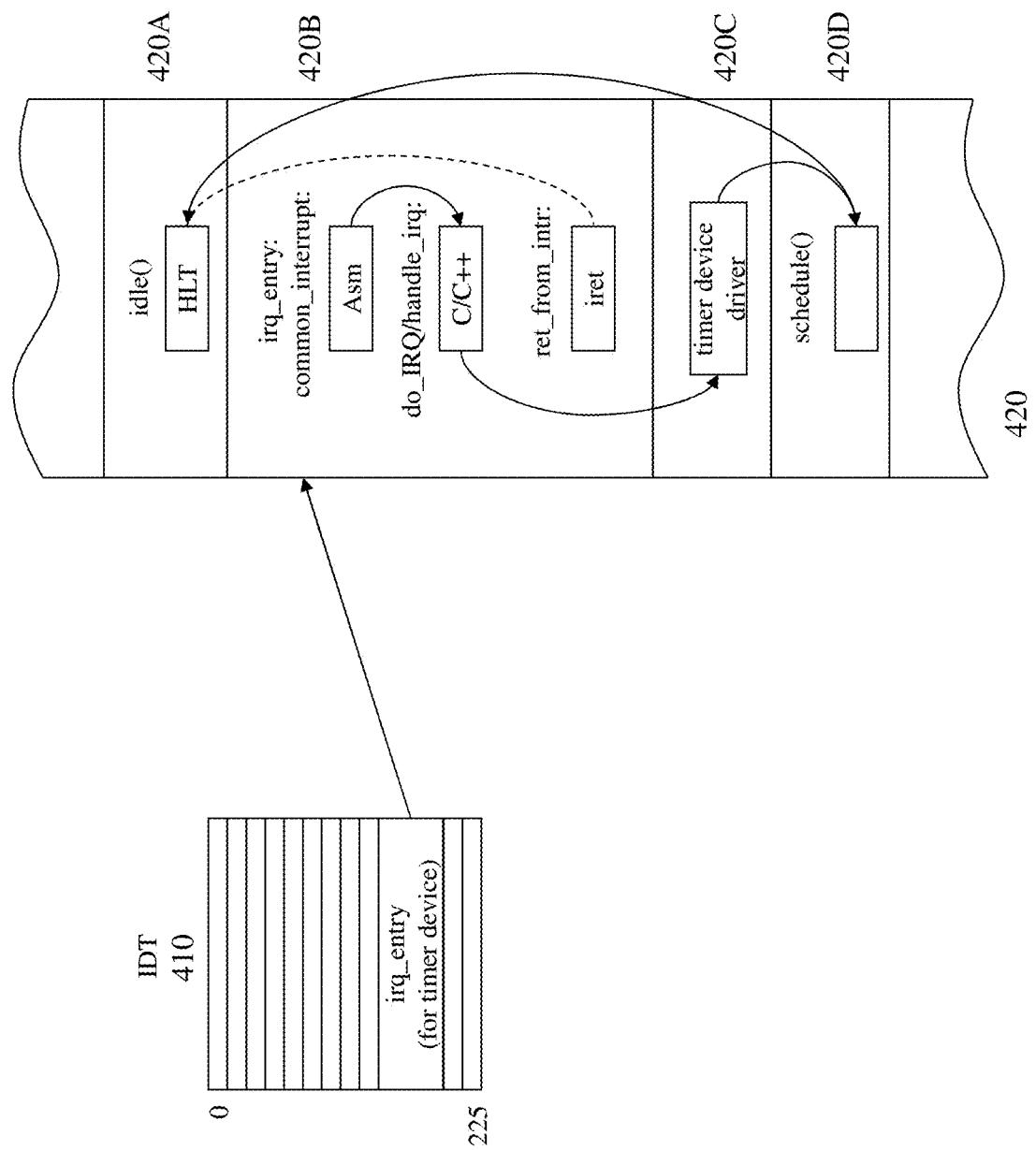
FIG. 4 depicts schematically an entry within an Interrupt Descriptor Table relating to a real guest device interrupt injection according to an embodiment of the invention.
Figure 5A:
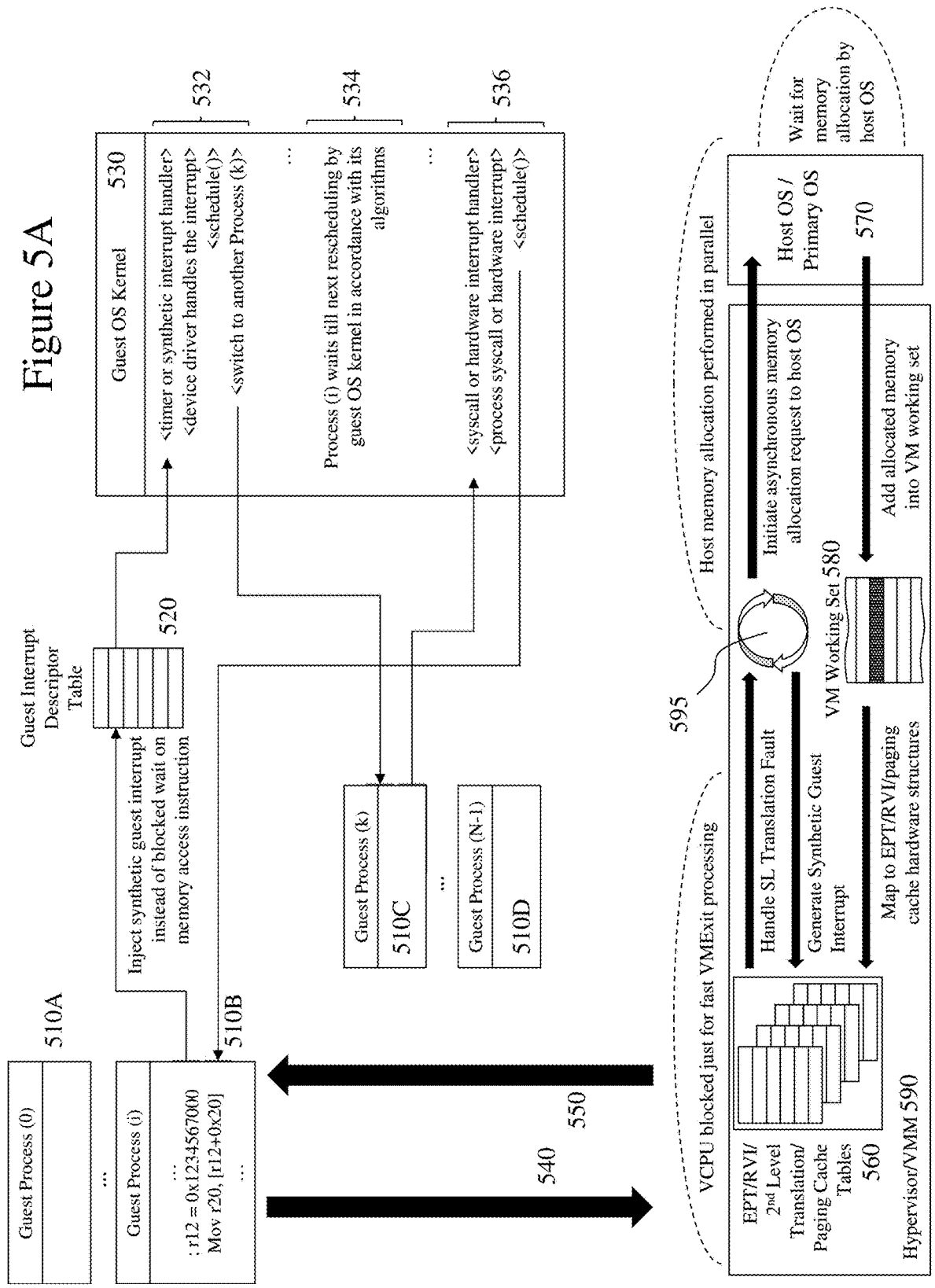
FIGS. 5A and 5B depict a simplified schematic and process flow respectively for a basic or universal process according to an embodiment of the invention.
Figure 5B:
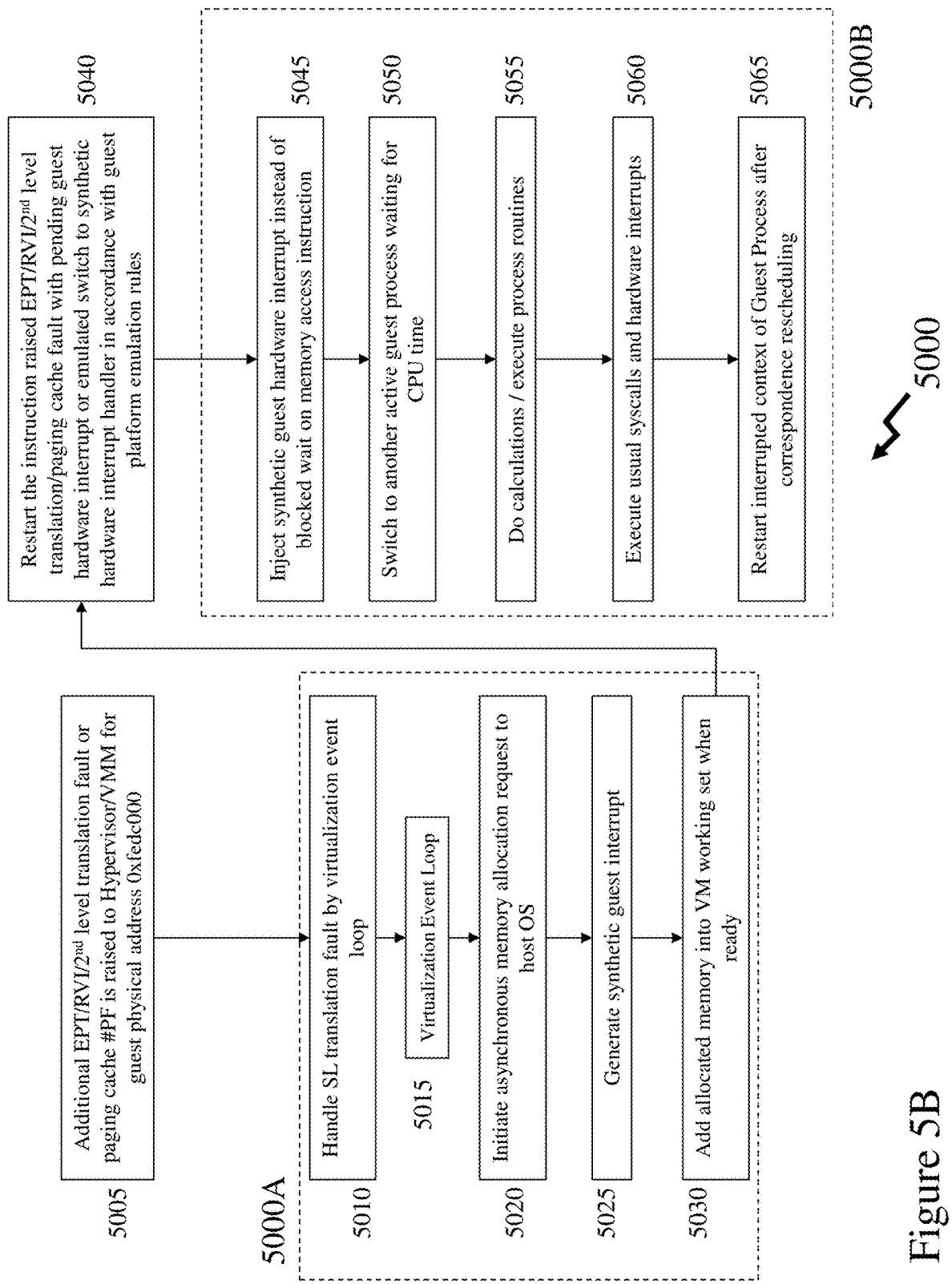

Now referring to FIGS. 4, 5A and 5B there are depicted schematic representations of a basic or universal VMM rescheduling mechanism according to an embodiment of the invention which allows a blocked VCPU to become unblocked despite being dependent upon unresolved guest-to-host physical page mapping. Accordingly, these embodiments of the invention introduce an asynchronous schema which passes physical memory allocation requests to a host OS and generates synthetic guest hardware interrupts on the blocked context(s) to save the blocked context(s) allowing the VCPU to pass execution to a guest OS kernel with further rescheduling to useful non-blocked routines/processes/threads.

FIG. 4 depicts schematically an entry within an Interrupt Descriptor Table (IDT) 410 relating to a real guest device interrupt injection, irq_entry, where such an interrupt may be provided, for example, by a timer device, an inter-processor interrupt (IPI), or from an item of guest hardware, wherein the process may not react to a fake interrupt without data and accordingly may just ignore it as it may a real guest exception injection without guest idle states recognition. (An IPI representing a special type of interrupt wherein one processor may interrupt another processor in a multiprocessor system if the interrupting processor requires action from the other processor). As depicted the irq_entry within the IDT 410 is depicted as a second process block of first to fourth blocks 420A to 420D respectively. Within first block 420A the IDT 410 comprises an <idle( )> with a halt command, HLT. Second block 420B comprises an interrupt request entry <irq_entry: common interrupt:> (Asm), performs the interrupt request <do_IRQ/handle_irq:> (C/C++) and returns from the interrupt <ret_from_intr:> (iret). As depicted, the <do_IRQ/handle_irq:> (C/C++) links to third block 420C comprising a timer device driver before proceeding to fourth block 420D with <schedule ( )> and returning to the first block 420A to idle. In order to prevent cycling EPT faults the VMM limits the number of repeating faults and moves the VCPU to a blocked state until completion of the host physical page allocation.

Now referring to FIGS. 5A and 5B there are depicted a simplified schematic and process flow of what the inventors refer to as a basic/universal process according to an embodiment of the invention. Accordingly, as depicted in FIG. 5A a processor is executing first to fourth processes 510A to 510D respectively, these being Guest Process (0), Guest Process (i), Guest Process (k) and Guest Process (N−1). Accordingly, second process 510B, Guest Process (i), in common with the schematics described and depicted in respect of FIGS. 2A to 3 respectively seeks to execute a "mov" request resulting in the injection of a synthetic guest interrupt, instead of a blocked wait on memory access instruction, to a Guest Interrupt Descriptor Table 520. The guest process (i) virtual address space and guest process (i) paging structures depicted in FIGS. 2A to 3 respectively being omitted for clarity. Accordingly, the process proceeds to Guest OS Kernel 530 wherein first command block 532 is executed wherein a timer or synthetic interrupt handler is initiated, the interrupt is handled, a task scheduled, e.g. page access request upon a peripheral memory device wherein the Guest OS Kernel 530 switches to another process, third process 510C Guest Process (k), whilst the slower process for Guest Process (i) 510B is performed such as described and depicted above in respect of FIGS. 2A to 3 respectively wherein the associated elements such as guest storage device and guest physical memory have been omitted for clarity together with the associated indicators of process sequence steps involving these elements.

It would be evident to one of skill in the art that two kinds of events occurred automatically as raised by the real CPU, namely guest #PF and then the EPT fault. Optimization of blocked EPT faults is a focus of embodiments of the invention and this description. Initially, there were no accesses to the page with linear address 0x1234567000. Accordingly, the first access may generate a guest #PF as guest OS kernel still does not prepare PTE within the guest paging structures (such as described in the cases of block 230 in FIG. 2A or block 2030 in FIG. 2B). After the usual guest #PF handling routines shown in FIGS. 2A and 2B respectively are established then guest PTE becomes valid and starts referencing the guest physical address 0xfedc000. However, a return from the guest OS kernel to restart the "mov" instruction will raise an EPT fault as the Hypervisor/VMM did not add to the EPT tables any mappings for the guest physical page 0xfedc000. Accordingly, embodiments of the invention move handling of EPT faults to an asynchronous schema with raises a third kind of event, a synthetic guest interrupt.

The Guest OS Kernel 530 from first command block 532 switches to the third process 510C, Guest Process (k), whilst the second command block 534 is performed wherein the second process block 510B, Guest Process (i), waits until the next rescheduling by the Guest OS Kernel 530 in accordance with its algorithms. Subsequently, upon completion of the process step within second process 510B, Guest Process (i), which resulted in its suspension then third command block 536 is undertaken wherein a syscall or hardware interrupt handler processes the appropriate system call (syscall) or hardware interrupt therein allowing second process 510B, Guest Process (i), to progress.

Further, in common with FIG. 3, Hypervisor/VMM 590 receives an EPT/RVI/second level transaction fault or paging cache #PF from second process 510B, Guest Process (i). This is issued initially and results in the Hypervisor/VMM 590 providing the synthetic hardware interrupt which is injected into the Guest Interrupt Descriptor Table 520. The initial communication of this EPT/RVI/second level transaction fault or paging cache #PF from second process 510B being depicted by first process flow 540. The EPT/RVI/second level transaction fault or paging cache #PF being for the guest physical address within the physical memory, not depicted for clarity, such as Guest Physical Memory 3070 and the physical address, e.g. 0xfedc000.

Accordingly, the Hypervisor/VMM 590 is depicted as comprising EPT/RVI/2nd Level Translations/Paging Cache Tables 560, VM Working Set 580 and a Virtualization Event Loop 595. The Hypervisor/VMM 590 communicating in addition with the processes, such as second process 510B (Guest Process (i)), to Host OS/Primary OS 570. Accordingly, the Hypervisor/VMM 590 generates an initial process to handle a second level translation fault to the Virtualization Event Loop 595 which initiates an asynchronous memory allocation request to the Host OS/Primary OS 570 and generates a synthetic guest interrupt. The process then waits for the memory allocation by the Host OS/Primary OS 570. Once, this is completed then the allocated memory is added into the VM Working Set 580 wherein the allocated memory within the VM Working Set 580 is then mapped to the EPT/RVI/2nd Level Translations/Paging Cache Tables 560. Accordingly, the Hypervisor/VMM 590 as depicted schematically to the left of the Virtualization Event Loop 595 has the VCPU blocked just for fast VM Exit processing whereas as depicted schematically on the right of the Virtualization Event Loop 595 the host memory allocation is performed in parallel. The return process from the Hypervisor/VMM 590 to the second process 510B, Guest Process (i), being depicted by second process flow 550. Second process flow 550 restarts the instruction within the second process 50B, Guest Process (i), which raised the EPT/RVI/second level transaction fault or paging cache #PF with either a pending guest hardware interrupt or an emulated switch to the synthetic hardware interrupt generated by the Virtualization Event Loop 595 in accordance with the guest platform emulation rules. Accordingly, the second process flow 550 provides the synthetic hardware interrupt injected into the Guest Interrupt Descriptor Table 520.

Now referring to FIG. 5B there is depicted a process flow 5000 depicting in flowchart form the VM process according to an embodiment of the invention as depicted in FIG. 5A. Accordingly, process flow 5000 begins with first step 5005 wherein the EPT/RVI/2nd level translation fault or paging cache #PF is raised to the Hypervisor/VMM, such as Hypervisor/VMM 590 in FIG. 5A, for guest physical address 0xfedc000. From first step 5005 the process flow 5000 proceeds to first process sub-block 5000A comprising second to sixth steps 5010 to 5030, respectively. These comprising:

Second step 5010 wherein the second level translation fault is handled by a virtualization event loop, see for example Virtualization Event Loop 595 in FIG. 5A;

Third step 5015 wherein the virtualization event loop executes;

Fourth step 5020 wherein the asynchronous memory allocation request is sent from the virtualization event loop to the host OS, for example Host OS/Primary OS 570 in FIG. 5B;

Fifth step 5025 wherein the virtualization event loop generates a synthetic guest interrupt; and Sixth step 5030 wherein the memory allocated by the host OS is added into the VM working set, for example VM Working Set 580.

Accordingly, from sixth step 5030 in first process sub-block 500A the process flow 5000 proceeds to seventh step 5040 wherein the instruction which raised EPT/RVI/2$^{nd}$ level translation/paging cache fault is restarted with pending guest hardware interrupt or emulated switch to synthetic hardware interrupt handler in accordance with guest platform emulation rules. At this point, the process flow 5000 proceeds to second process sub-block 5000B comprising eighth to twelfth steps 5045 to 5065, respectively. These comprising:

Eighth step 5045 wherein the synthetic guest hardware interrupt is injected instead of a blocked wait on the memory access instruction;

Ninth step 5050 wherein the process switches to another guest process which is waiting for CPU time;

Tenth step 5055 wherein the processor performs calculations and/or executes process routines;

Eleventh step 5060 wherein the process executes usual syscalls and hardware interrupts; and Twelfth step 5065 wherein the process restarts the interrupted context of the Guest Process after its corresponding rescheduling.

Figure 6A:
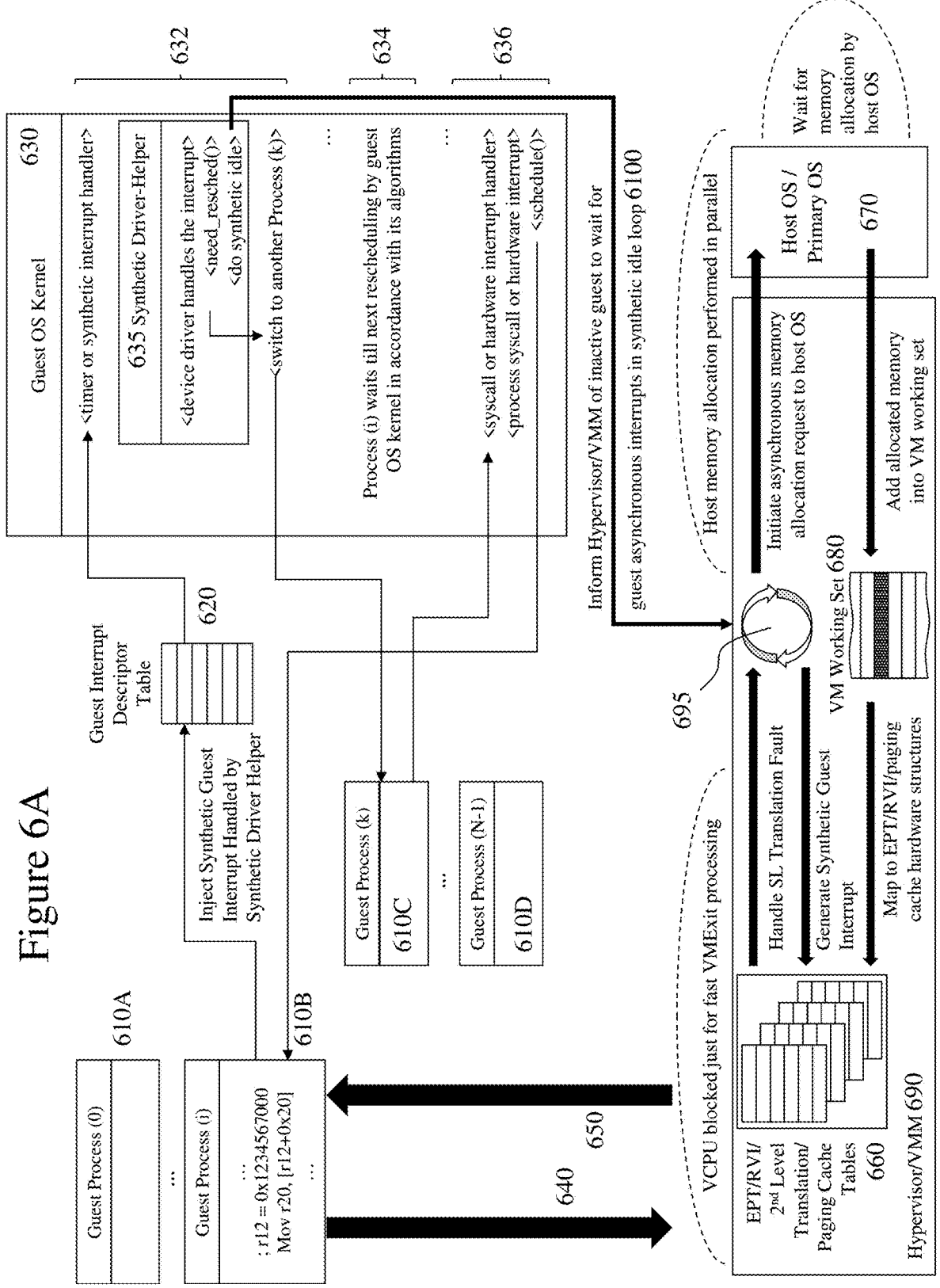
FIGS. 6A and 6B depict a simplified schematic and process flow respectively of an extended process according to an embodiment of the invention with a synthetic guest driver installed.
Figure 6B:
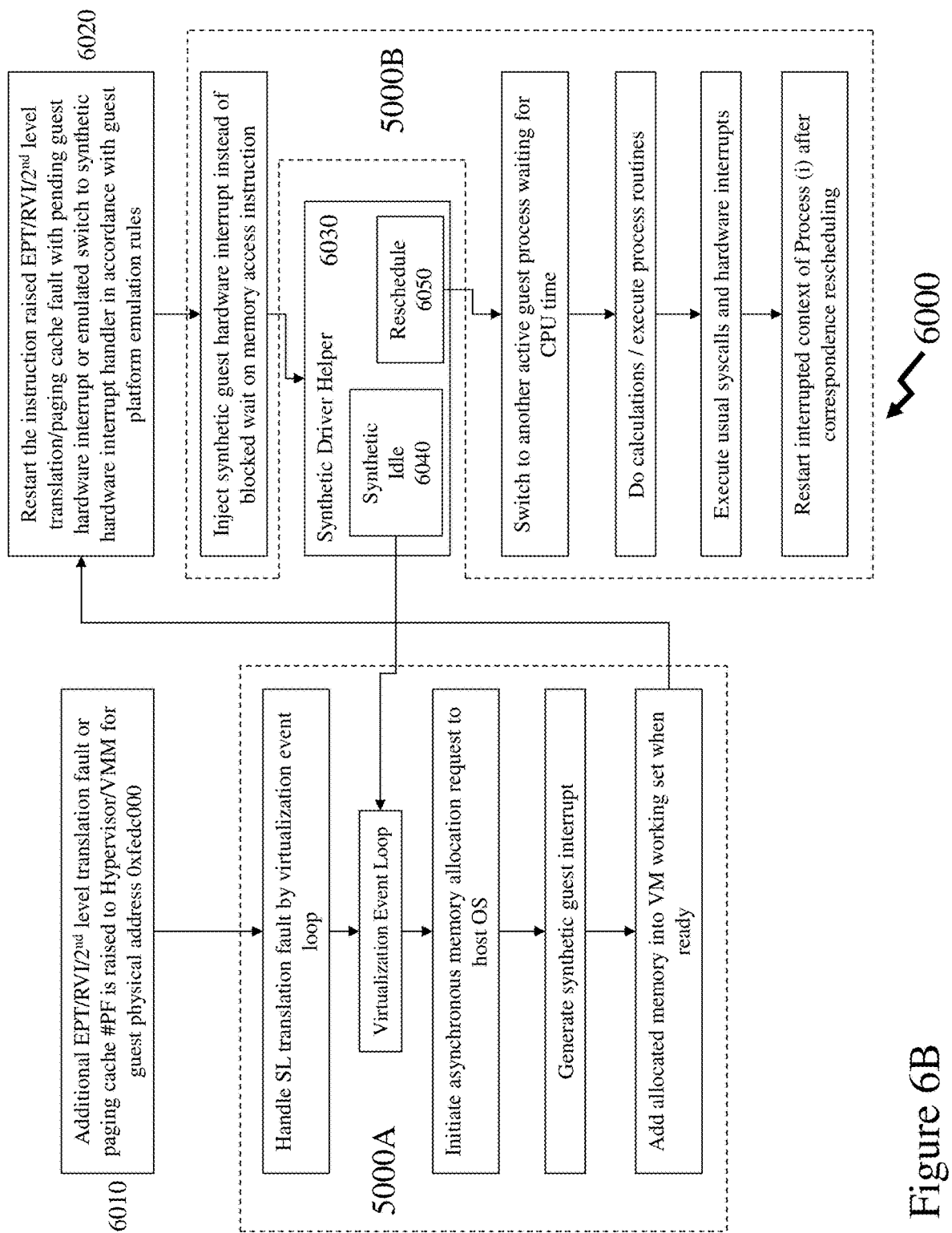

Now referring to FIGS. 6A and 6B there are depicted a schematic and process flow of an extended process according to an embodiment of the invention with a synthetic guest driver installed. The synthetic guest interrupt injection being handled by a synthetic guest driver which allows for the processor/processes to eliminate guest event conflicts and excessive OS kernel checks to identify what causes particular synthetic interrupts to happen. Additionally, the guest driver allows for recognition of guest OS idle states and speeds up blocked process resumption after page allocation completion.

Accordingly, as depicted in FIG. 6A a processor is executing first to fourth processes 610A to 610D respectively, these being Guest Process (0), Guest Process (i), Guest Process (k) and Guest Process (N−1). Accordingly, second process 610B, Guest Process (i), in common with the schematics described and depicted in respect of FIGS. 2A to 3 and 5A respectively seeks to execute a "mov" request resulting in the injection of a synthetic guest interrupt generated by the Hypervisor/VMM 690, instead of either a blocked wait on memory access instruction or #PF as described and depicted in respect of FIG. 3, to a Guest Interrupt Descriptor Table 620. The guess process (i) virtual address space and guest process (i) paging structures depicted in FIGS. 2A to 3 respectively being omitted for clarity. Accordingly, the process proceeds to Guest OS Kernel 630 wherein first command block 632 is executed wherein Synthetic Driver Helper 635 is initiated and the Guest OS Kernel 630 switches to another process, third process 610C Guest Process (k), whilst the slower process for Guest Process (i) 610B is performed such as described and depicted above in respect of FIGS. 2A to 3 and 5 respectively wherein the associated elements such as guest storage device and guest physical memory have been omitted for clarity together with the associated indicators of process sequence steps involving these elements.

The Guest OS Kernel 630 from first command block 632 switches to the third process 610C, Guest Process (k), whilst the second command block 634 is performed wherein the second process block 610B, Guest Process (i), waits until the next rescheduling by the Guest OS Kernel 630 in accordance with its algorithms. Subsequently, upon completion of the process step within second process 610B, Guest Process (i), which resulted in its suspension then third command block 636 is undertaken wherein a system call (syscall) or hardware interrupt handler processes the appropriate syscall or hardware interrupt therein allowing second process 610B, Guest Process (i), to progress.

In common with FIG. 3, Hypervisor/VMM 690 receives an EPT/RVI/second level transaction fault or paging cache #PF from second process 610B, Guest Process (i). This is issued initially and results in the Hypervisor/VMM 690 providing the synthetic hardware interrupt which is injected into the Guest Interrupt Descriptor Table 620. This being depicted by first process flow 640. The EPT/RVI/second level transaction fault or paging cache #PF being for the guest physical address within the physical memory, not depicted for clarity, such as Guest Physical Memory 3070 and the physical address, e.g. 0xfedc000.

Accordingly, the Hypervisor/VMM 690 is depicted as comprising EPT/RVI/2nd Level Translations/Paging Cache Tables 660, VM Working Set 680 and a Virtualization Event Loop 695. The Hypervisor/VMM 690 communicating in addition with the processes, such as second process 610B (Guest Process (i)), to Host OS/Primary OS 670. Accordingly, the Hypervisor/VMM 690 generates an initial process to handle a second level translation fault to the Virtualization Event Loop 695 which initiates an asynchronous memory allocation request to the Host OS/Primary OS 670 and generates a synthetic guest interrupt. The process then waits for the memory allocation by the Host OS/Primary OS 670. Once, this is completed then the allocated memory is added into the VM Working Set 680 wherein the allocated memory within the VM Working Set 680 is then mapped to the EPT/RVI/2nd Level Translations/Paging Cache Tables 660. Accordingly, the Hypervisor/VMM 690 as depicted schematically to the left of the Virtualization Event Loop 695 has the VCPU blocked just for fast VM Exit processing whereas as depicted schematically on the right of the Virtualization Event Loop 695 the host memory allocation is performed in parallel. The return process from the Hypervisor/VMM 690 to the second process 610B, Guest Process (i), being depicted by second process flow 650. Second process flow 650 restarts the instruction within the second process 50B, Guest Process (i), which raised the EPT/RVI/second level transaction fault or paging cache #PF with either a pending guest hardware interrupt or an emulated switch to the synthetic hardware interrupt generated by the Virtualization Event Loop 695 in accordance with the guest platform emulation rules. Accordingly, the second process flow 650 provides the synthetic hardware interrupt injected into the Guest Interrupt Descriptor Table 620.

The Synthetic Driver Helper 635 performs several process steps including:

handling the interrupt from the timer or synthetic interrupt handler;

performing the rescheduling leading to first command block 632 switching to the third process 610C, Guest Process (k); and performing a synthetic idle wherein the Synthetic Device Helper 635 links to the Virtualization Event Loop 695 via process 6100 wherein the Synthetic Device Helper 635 informs the Hypervisor/VMM of the inactive guest and waits for guest synthetic interrupt(s) in the synthetic idle loop.

Now referring to FIG. 6B there is depicted a process flow 6000 depicting in flowchart form the VM process according to an embodiment of the invention as depicted in FIG. 6A. Accordingly, process flow 6000 begins with first step 6010 wherein the EPT/RVI/2nd level translation fault or paging cache #PF is raised to the Hypervisor/VMM, such as Hypervisor/VMM 690 in FIG. 6A, for guest physical address 0xfedc000. From first step 6010 the process flow 6000 proceeds to a series of steps equivalent to first process sub-block 5000A as described above in respect of FIG. 5B. First process sub-block 5000A comprising steps with respect to:

second level translation fault handling by a virtualization event loop, see for example Virtualization Event Loop 695 in FIG. 6A;

execution of the virtualization event loop;

transmission of the asynchronous memory allocation request from the virtualization event loop to the host OS, for example Host OS/Primary OS 670 in FIG. 6B;

generation by the virtualization event loop of the synthetic guest interrupt; and allocation of memory by the host OS is added into the VM working set, for example VM Working Set 680.

Accordingly, from first process sub-block 5000A the process flow 6000 proceeds to second step 6020 wherein the instruction which raised EPT/RVI/2nd level translation/paging cache fault is restarted with pending guest hardware interrupt or emulated switch to synthetic hardware interrupt handler in accordance with guest platform emulation rules. At this point the process flow 6000 proceeds to a series of steps equivalent to second process sub-block 5000B as described above in respect of FIG. 5B but now with a Synthetic Driver Helper 6030 inserted. Accordingly, second process sub-block comprising steps with respect to:
- injection of a synthetic guest hardware interrupt instead of a blocked wait on the memory access instruction;
- switching the process to another guest process which is waiting for CPU time;
- performing calculations and/or executes process routines;
- executing usual syscalls and hardware interrupts; and
- restarting the interrupted context of the Guest Process after its corresponding rescheduling.

The Synthetic Driver Helper 6030 being inserted between the injection of the synthetic guest hardware interrupt and switching to another process. As depicted the Synthetic Driver Helper 6030 comprises first sub-block 6040 for providing the synthetic idle and second sub-block 6050 which initiates the re-scheduling and links to the step of switching the process to another guest process. The first sub-block 6030 as depicted communicates to the Virtualization Event Loop within the Hypervisor/VMM as depicted within first process sub-block 5000A. This communication being that depicted and described in FIG. 6A with process 6100 wherein the Synthetic Device Helper 635 informs the Hypervisor/VMM of the inactive guest and waits for guest synthetic interrupt(s) in the synthetic idle loop process of first sub-block 6040.

Whilst the specification and descriptions with respect to embodiments of the invention primarily illustrate optimization for synchronous instances of memory allocations for guest physical pages from the Host OS/Primary OS it would be evident to one of skill in the art that the embodiments of the invention are not limited solely to those described and depicted. Rather, embodiments of the invention may be applied to any instances wherein virtualization/emulation of guest instructions is blocked until some later point in time with the appearance of requested data. Accordingly, embodiments of the invention may also be applied to instances of delayed synchronous I/O operations to guest devices such as those arising from extended duration device register reads/writes due to the virtualization implemented.

Accordingly, embodiments of the invention may generally support optimizing execution of synchronous workloads which are performed in virtualized environments and block virtual central processing unit (CPU) execution synchronously for periods of time. Accordingly, embodiments of the invention whilst described and depicted with respect to virtual machines may be with any virtualization techniques where execution routine(s) representing virtualizable processor resource(s) can be interrupted (e.g. seamlessly for a virtualized environment) for a significant time and there are processor time schedulers are in execution within the virtualized environment.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above and/or a combination thereof.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be rearranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function. Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

Also, it should be noted that all of these terms, and other similar terms, are to be associated with appropriate physical quantities and are merely convenient labels applied to these quantities. Unless specifically stated otherwise, as apparent from the following discussion, it is appreciated that throughout the description, discussions utilizing terms such as "identifying," "determining," "storing," "adjusting," "causing," "returning," "comparing," "creating," "stopping," "loading," "copying," "throwing," "replacing," "performing," or the like, refer to the action and processes of one or more computer systems, or similar electronic computing devices such as a PED and/or FED, that manipulates and transforms data represented as physical (electronic) quantities within a computer system's memory registers and/or memories into other data similarly represented as physical quantities within the memories and/or memory registers of the same computer system or one or more other computer systems accessible to the computer system over one or more data communication networks or other such information storage, transmission or display devices as appropriate.

Furthermore, embodiments may be implemented by hardware, software, scripting languages, firmware, middleware, microcode, hardware description languages and/or any combination thereof. When implemented in software, firmware, middleware, scripting language and/or microcode, the program code or code segments to perform the necessary tasks may be stored in a machine readable medium, such as a storage medium. A code segment or machine-executable instruction may represent a procedure, a function, a subprogram, a program, a routine, a subroutine, a module, a software package, a script, a class, or any combination of instructions, data structures and/or program statements. A code segment may be coupled to another code segment or a hardware circuit by passing and/or receiving information, data, arguments, parameters and/or memory content. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor and may vary in implementation where the memory is employed in storing software codes for subsequent execution to that when the memory is employed in executing the software codes. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, and/or various other mediums capable of storing or containing instruction(s) and/or data in a non-transitory manner.

The methodologies described herein are, in one or more embodiments, performable by a machine which includes one or more processors that accept code segments containing instructions. For any of the methods described herein, when the instructions are executed by the machine, the machine performs the method. Any machine capable of executing a set of instructions (sequential or otherwise) that specify actions to be taken by that machine are included. Thus, a typical machine may be exemplified by a typical processing system that includes one or more processors. Each processor may include one or more of a CPU, a graphics-processing unit, and a programmable DSP unit. The processing system further may include a memory subsystem including main RAM and/or a static RAM, and/or ROM. A bus subsystem may be included for communicating between the components. If the processing system requires a display, such a display may be included, e.g., a liquid crystal display (LCD). If manual data entry is required, the processing system also includes an input device such as one or more of an alphanumeric input unit such as a keyboard, a pointing control device such as a mouse, and so forth.

The memory includes machine-readable code segments (e.g. software or software code) including instructions for performing, when executed by the processing system, one of more of the methods described herein. The software may reside entirely in the memory, or may also reside, completely or at least partially, within the RAM and/or within the processor during execution thereof by the computer system. Thus, the memory and the processor also constitute a system comprising machine-readable code.

In alternative embodiments, the machine operates as a standalone device or may be connected, e.g., networked to other machines, in a networked deployment, the machine may operate in the capacity of a server or a client machine in server-client network environment, or as a peer machine in a peer-to-peer or distributed network environment. The machine may be, for example, a computer, a server, a cluster of servers, a cluster of computers, a web appliance, a distributed computing environment, a cloud computing environment, or any machine capable of executing a set of instructions (sequential or otherwise) that specify actions to be taken by that machine. The term "machine" may also be taken to include any collection of machines that individually or jointly execute a set (or multiple sets) of instructions to perform any one or more of the methodologies discussed herein.

The foregoing disclosure of the exemplary embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A method comprising:
providing a computer system comprising one or more processors executing a host operating system (OS) and supporting a plurality of plurality of guest OS processes within a virtualization environment; wherein the one or more processors are configured to:
determine whether a current process step of a first guest OS process of the
plurality of guest OS processes has an associated timing which exceeds a predetermined period of time;
upon a positive determination that the current process step timing exceeds the predetermined period of time triggering a rescheduling routine for the first OS process of the plurality of guest OS processes and an asynchronous shift to a second guest OS process of the plurality of guest OS processes;

determining whether an indication is received with respect to completion of the current process step of first OS process of the plurality of guest OS processes;

upon a positive determination that the indication was received with respect to completion of the current process step of first OS process of the plurality of guest OS processes:
establishing an interrupt on the second guest OS process of the plurality of guest OS processes; and
resuming execution of the first OS process of the plurality of guest OS processes;

upon a negative determination that the current process step timing exceeds the predetermined period of time:
executing the current process step of the first guest OS process of the plurality of guest OS processes; and
determining whether an indication of a first fault relating to an instruction of the current process step or a subsequent process step is raised by the first guest OS process of the plurality of guest OS processes; and
upon a positive determination of the first fault executing a sub-process; and the sub-process comprises the steps of:
communicating the indication of the first fault to a virtual machine monitor (VMM) in execution upon the one or more processors;
handling the first fault with a virtualization event loop forming part of the VMM;
initiating an asynchronous memory allocation request to a host operating system (OS) from the virtualization event loop;
generating a synthetic guest interrupt with the virtualization event loop;
restarting the instruction of the first guest OS process of the plurality of guest OS processes with either a pending guest hardware interrupt or an emulated switch to a synthetic hardware interrupt handler in accordance with a set of guest emulation rules associated with the first computer system;
injecting a synthetic hardware interrupt into a guest interrupt descriptor table forming part of the first memory;
executing a guest operating system kernel which:
handles with a synthetic interrupt handler the synthetic hardware interrupt;
establishes a scheduling operation;
transmits a request to a further non-transitory storage memory storing data a request for a page of data; and
interrupts the first process of the plurality of processes;
switches execution from the first process of the plurality of processes to a second process of the plurality of processes; and
receives a hardware interrupt from the further non-transitory storage memory;
adding allocated memory established in dependence by the host OS in dependence upon the memory allocation request to a virtual machine working set forming part of the VMM;
mapping that portion of the virtual machine working set related to the allocated memory to a set of cache tables forming part of the VMM; and restarting the first process of the plurality of processes based upon rescheduling established by the scheduling operation.

2. The system according to claim 1, wherein
the injection of the synthetic hardware interrupt optimizes time utilization of a virtual processor of a plurality of virtual processors across a predetermined subset of the plurality of guest OS processes associated with the virtual processor of the plurality of virtual processors.

3. A method comprising:
providing a computer system comprising one or more processors executing a host operating system (OS) and supporting a plurality of plurality of guest OS processes within a virtualization environment; wherein the one or more processors are configured to:
determine whether a current process step of a first guest OS process of the plurality of guest OS processes has an associated timing which exceeds a predetermined period of time;
upon a positive determination that the current process step timing exceeds the predetermined period of time triggering a rescheduling routine for the first OS process of the plurality of guest OS processes and an asynchronous shift to a second guest OS process of the plurality of guest OS processes;
determining whether an indication is received with respect to completion of the current process step of first OS process of the plurality of guest OS processes;
upon a positive determination that the indication was received with respect to completion of the current process step of first OS process of the plurality of guest OS processes:
establishing an interrupt on the second guest OS process of the plurality of guest OS processes; and
resuming execution of the first OS process of the plurality of guest OS processes;
upon a negative determination that the current process step timing exceeds the predetermined period of time:
executing the current process step of the first guest OS process of the plurality of guest OS processes; and
determining whether an indication of a first fault relating to an instruction of the current process step or a subsequent process step is raised by the first guest OS process of the plurality of guest OS processes; and
upon a positive determination of the first fault executing a sub-process; and the sub-process comprises the steps of:
communicating the indication of the first fault to a virtual machine monitor (VMM) in execution upon the one or more processors;
handling the first fault with a virtualization event loop forming part of the VMM;
initiating an asynchronous memory allocation request to a host operating system (OS) from the virtualization event loop;
generating a synthetic guest interrupt with the virtualization event loop;
restarting the instruction of the first guest OS process of the plurality of guest OS processes with either a pending guest hardware interrupt or an emulated switch to a synthetic hardware interrupt handler in accordance with a set of guest emulation rules associated with the first computer system;

injecting a synthetic hardware interrupt into a guest interrupt descriptor table forming part of the first memory;

executing a guest operating system kernel which:
  establishes a synthetic driver helper;
  switches execution from the first guest OS process of the plurality of guest OS processes to the second guest OS process of the plurality of guest OS processes; and
  receives a hardware interrupt from the non-transitory storage memory;

adding allocated memory established by the host OS in dependence upon the memory allocation request to a virtual machine working set forming part of the VMM;

mapping that portion of the virtual machine working set related to the allocated memory to a set of cache tables forming part of the VMM; and restarting the first guest OS process of the plurality of guest OS processes based upon a rescheduling established by a scheduling operation.

4. The system according to claim 3, wherein
the injection of the synthetic hardware interrupt optimizes time utilization of a virtual processor of a plurality of virtual processors across a predetermined subset of the plurality of guest OS processes associated with the virtual processor of the plurality of virtual processors.

5. The system according to claim 3, wherein
the synthetic driver helper:
  establishes an interrupt handler to handle the synthetic hardware interrupt;
  establishes the scheduling operation; and
  executes a synthetic idle process; and
the scheduling operation triggers switching execution of the second guest OS process of the plurality of guest OS processes.

6. The system according to claim 3, wherein
the synthetic driver helper:
  establishes an interrupt handler to handle the synthetic hardware interrupt;
  establishes the scheduling operation; and
  executes a synthetic idle process which communicates to the virtualization event loop to inform the virtualization event loop about the inactive first process of the plurality of processes and waits for one or more guest asynchronous interrupts from a synthetic idle loop; and
the scheduling operation triggers switching execution of the second process of the plurality of processes.

* * * * *